(12) United States Patent
Perry-Eaton

(10) Patent No.: US 12,091,270 B2
(45) Date of Patent: Sep. 17, 2024

(54) SYSTEM FOR TRANSFERRING ARTICLES FROM A CONTAINER

(71) Applicant: United States Postal Service, Washington, DC (US)

(72) Inventor: Wayne R. Perry-Eaton, Leesburg, VA (US)

(73) Assignee: United States Postal Service, Washington, DC (US)

( * ) Notice: Subject to any disclaimer, the term of this patent is extended or adjusted under 35 U.S.C. 154(b) by 431 days.

(21) Appl. No.: 17/478,487

(22) Filed: Sep. 17, 2021

(65) Prior Publication Data

US 2022/0089381 A1     Mar. 24, 2022

Related U.S. Application Data

(60) Provisional application No. 63/080,297, filed on Sep. 18, 2020.

(51) Int. Cl.
*B65H 15/02* (2006.01)
*B07C 1/02* (2006.01)
(Continued)

(52) U.S. Cl.
CPC ............ *B65H 15/02* (2013.01); *B07C 1/025* (2013.01); *B65G 47/647* (2013.01);
(Continued)

(58) Field of Classification Search
CPC ........ B07C 1/025; B65H 1/025; B65H 15/02; B65H 2301/42242; B65H 2301/422542;
(Continued)

(56) References Cited

U.S. PATENT DOCUMENTS 5,271,710 A    12/1993  Decharran et al.
5,585,568 A *  12/1996  Moncrief ............... B65H 1/025
                                                        73/788
(Continued)

FOREIGN PATENT DOCUMENTS

DE    10 2012 2199912 A1   4/2014
FR         2 706 331 A1   12/1994
WO       WO 99/20530 A1    4/1999

OTHER PUBLICATIONS

International Search Report and Written Opinion mailed Dec. 11, 2018 in International Application No. PCT/US2018/049762 filed Sep. 6, 2018.
(Continued)

*Primary Examiner* — James Keenan
(74) *Attorney, Agent, or Firm* — Knobbe, Martens, Olson & Bear LLP

(57) ABSTRACT

An automated system for transferring articles from a container. An item transfer system includes a rotatable tray rotary assembly, a translatable and rotatable intermediate rotary assembly, and a translatable and rotatable output rotary assembly. The system is configured to transfer articles from the tray to processing equipment by an automated process including rotationally transferring the articles from the tray to the intermediate rotary assembly and rotationally transferring the articles from the intermediate rotary assembly to the output rotary assembly. The output rotary assembly can move to align with a shelf or other input of the processing equipment and a paddle assembly can slide the items from the output rotary assembly onto the shelf or other input of the processing equipment.

20 Claims, 34 Drawing Sheets

(51) Int. Cl.
  *B65G 47/64* (2006.01)
  *B65G 47/90* (2006.01)
  *B65H 1/02* (2006.01)
  *B65G 47/76* (2006.01)

(52) U.S. Cl.
  CPC ......... *B65G 47/902* (2013.01); *B65G 47/907* (2013.01); *B65H 1/025* (2013.01); *B65G 47/766* (2013.01); *B65G 2201/0258* (2013.01); *B65G 2203/0283* (2013.01); *B65H 2301/42242* (2013.01); *B65H 2301/422542* (2013.01)

(58) Field of Classification Search
  CPC .. B65G 47/647; B65G 47/766; B65G 47/902; B65G 47/907
  USPC ......................................... 414/405, 759, 773
  See application file for complete search history.

(56) References Cited

U.S. PATENT DOCUMENTS

| | | | |
|---|---|---|---|
| 5,772,383 A * | 6/1998 | Kalika | ................... B07C 1/025 414/769 |
| 5,906,468 A | 5/1999 | Vander Syde et al. | |
| 6,217,274 B1 | 4/2001 | Svyatsky et al. | |
| 7,553,119 B2 | 6/2009 | Good et al. | |
| 7,572,094 B2 | 8/2009 | Miskiewicz et al. | |
| 7,866,936 B2 | 1/2011 | Schuck et al. | |
| 8,141,133 B2 | 3/2012 | Pagan | |
| 8,142,133 B2 | 3/2012 | Neebe et al. | |
| 8,172,498 B2 | 5/2012 | Enenkel | |
| 8,182,191 B2 * | 5/2012 | Cartal | ..................... B07C 1/025 414/407 |
| 8,226,345 B2 * | 7/2012 | De Leo | .............. B65H 31/3081 53/540 |
| 9,044,783 B2 * | 6/2015 | Brown | ..................... B65H 3/00 |
| 10,889,440 B2 * | 1/2021 | Perry-Eaton | ........... B65H 29/02 |
| 11,390,473 B2 * | 7/2022 | Perry-Eaton | ........... B07C 3/008 |
| 2010/0290867 A1 | 11/2010 | Nice et al. | |
| 2013/0247524 A1 | 9/2013 | Ford et al. | |

OTHER PUBLICATIONS

International Preliminary Report on Patentability mailed Mar. 19, 2020 in International Application No. PCT/US2018/049762 filed Sep. 6, 2018.

* cited by examiner

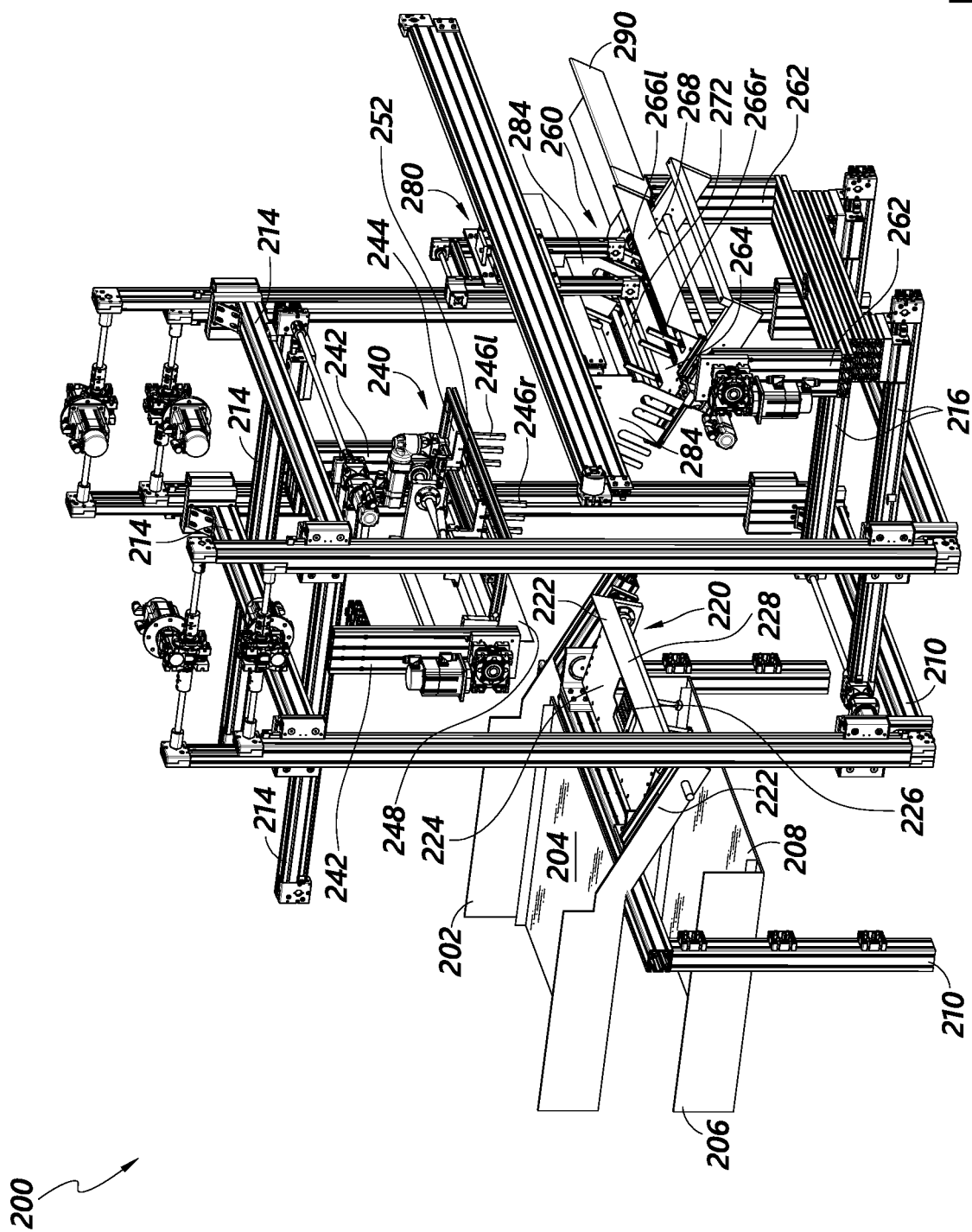

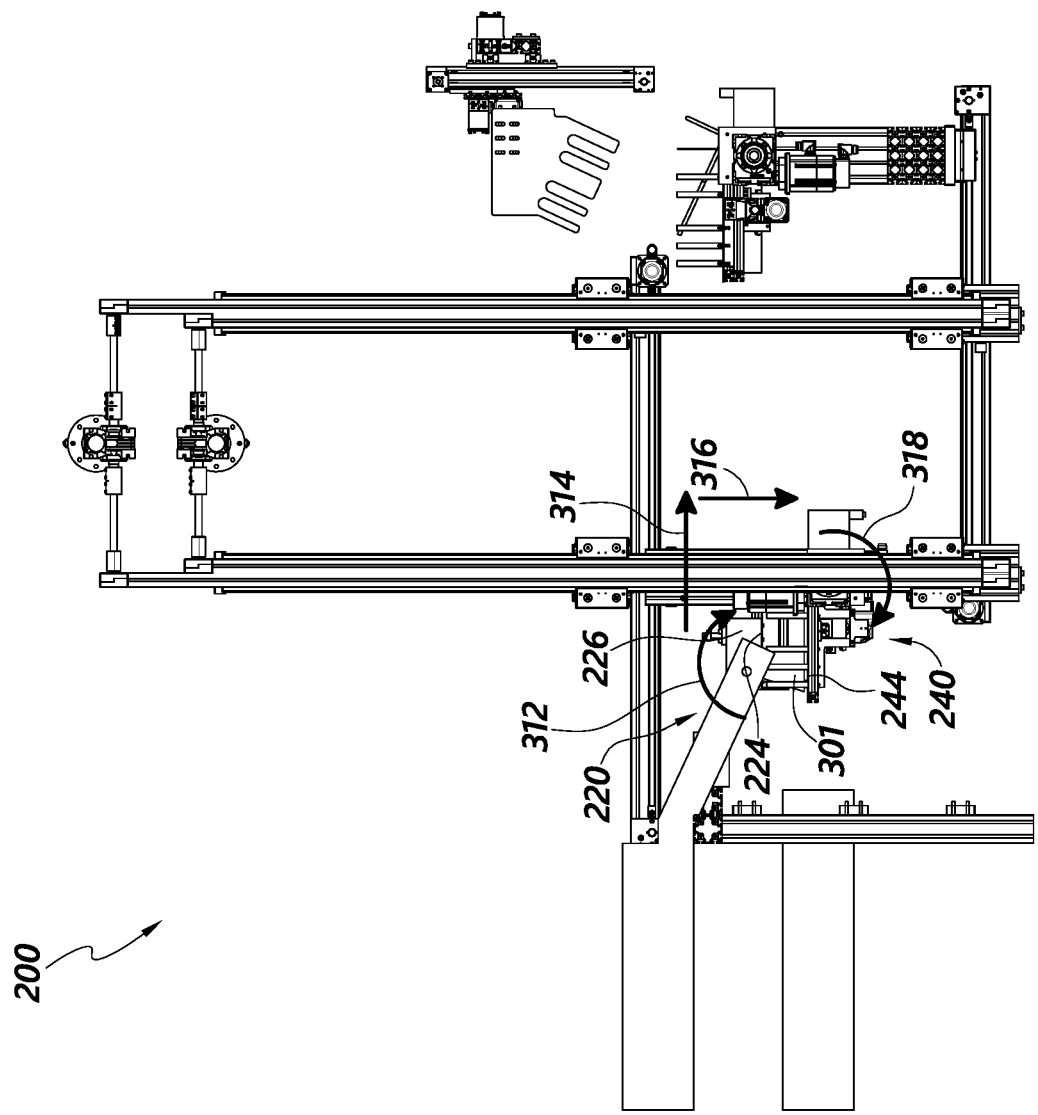

ly, moving the intermediate rotary assembly to a position above the tray rotary assembly and a rotational orientation in which the first platform is parallel to a bottom surface of the tray, simultaneously rotating the tray rotary assembly and the intermediate rotary assembly to rotationally transfer the one or more items from the tray rotary assembly to the intermediate rotary assembly, moving the output rotary assembly to a position above the intermediate rotary assembly and a rotational orientation in which the second platform is parallel to the first platform, and simultaneously rotating the intermediate rotary assembly and the output rotary assembly to rotationally transfer the one or more items from the intermediate rotary assembly to the output rotary assembly. In some embodiments, at least a subset of the second fingers are retractable fingers configured to retract from an extended position in which the retractable fingers extend through the second slots beyond the second platform to a lowered position in which the retractable fingers do not extend beyond the second platform, the lowered position permitting items to slide along the second platform over the retractable fingers. In some embodiments, the tray content transfer system further includes a paddle assembly including one or more paddles configured to slide items along the second platform when the second platform of the output rotary assembly is aligned with the output location. In some embodiments, the predetermined sequence further includes, after rotationally transferring the one or more items from the intermediate rotary assembly to the output rotary assembly, moving the output rotary assembly to a position in which the second platform is aligned with the output location, retracting the retractable fingers to the lowered position, and causing the one or more paddles to slide the one or more items from the output rotary assembly to the output location. In some embodiments, the controller is further configured to determine a first finger spacing between the plurality of first fingers following the rotational transfer of the one or more items from the tray rotary assembly to the intermediate rotary assembly, and move the plurality of second fingers to a second finger spacing corresponding to the first finger spacing prior to rotationally transferring the one or more items from the intermediate rotary assembly to the output rotary assembly. In some embodiments, the output location comprises a shelf associated with an item processing apparatus. In some embodiments, the tray content transfer system further includes a sensor configured to detect the presence of the tray within the tray content transfer system, wherein the controller is configured to initiate the predetermined sequence based at least in part on detecting the presence of the tray. In some embodiments, the controller is further configured to translate the intermediate rotary assembly along the horizontal and vertical axes while rotationally transferring the one or more items from the tray rotary assembly to the intermediate rotary assembly, such that the first platform remains parallel to the bottom surface of the tray. In some embodiments, the controller is further configured to translate at least the intermediate rotary assembly or the output rotary assembly along the horizontal and vertical axes while rotationally transferring the one or more items from the intermediate rotary assembly to the output rotary assembly, such that the second platform remains parallel to the first platform. In some embodiments, the retainer comprises a suction device configured to exert a suction force against a bottom surface of the tray.

In a second aspect, a method for transferring items from a tray includes, by an automated process, receiving a tray containing one or more items at a tray rotary assembly within a tray content transfer system; moving an interme-

SYSTEM FOR TRANSFERRING ARTICLES FROM A CONTAINER

CROSS-REFERENCE TO RELATED APPLICATIONS

This application claims the benefit of U.S. Provisional Application Ser. No. 63/080,297, filed Sep. 18, 2020, titled "SYSTEM FOR TRANSFERRING ARTICLES FROM A CONTAINER," the entirety of which is incorporated by reference herein.

FIELD

This disclosure relates to systems and methods for transfer of items from a tray to an item processing apparatus.

DESCRIPTION OF THE RELATED TECHNOLOGY

Items, such as letters, envelopes, postcards, etc., may be received, transported, transferred, processed, collected, sorted, or the like, in containers such as trays. Items may be removed from trays at various stages of transport and processing.

SUMMARY

The systems and methods of this disclosure each have several innovative aspects, no single one of which is solely responsible for its desirable attributes. Without limiting the scope as expressed by the claims that follow, its more prominent features will now be discussed briefly.

In a first aspect, a tray content transfer system comprises a frame, a tray rotary assembly, an intermediate rotary assembly, and an output rotary assembly. The tray rotary assembly is movably coupled to the frame and includes a retainer configured to releasably secure a tray within the tray rotary assembly. The tray rotary assembly is rotatable about a first axis. The intermediate rotary assembly is movably coupled to the frame and is rotatable about a second axis parallel to the first axis, translatable along a horizontal axis perpendicular to the second axis, and translatable along a vertical axis perpendicular to the second axis and the horizontal axis. The intermediate rotary assembly includes a first platform having a plurality of first slots therethrough parallel to the second axis and a plurality of movable first fingers extending through the first slots and configured to support one or more items therebetween. The output rotary assembly is movably coupled to the frame and is rotatable about a third axis parallel to the first axis, translatable along the horizontal axis, and translatable along the vertical axis. The output rotary assembly includes a second platform having a plurality of second slots therethrough parallel to the third axis and a plurality of movable second fingers extending through the second slots and configured to support the one or more items therebetween.

In some embodiments, the tray content transfer system further includes a controller configured to rotate the tray rotary assembly, the intermediate rotary assembly, and the output rotary assembly, to translate the intermediate rotary assembly and the output rotary assembly along the vertical axis and the horizontal axis, and to move the first fingers and the second fingers, in a predetermined sequence to transfer the one or more items from the tray to an output location. The predetermined sequence may include receiving the tray containing the one or more items on the tray rotary assemdiate rotary assembly of the tray content transfer system to a position above the tray rotary assembly; simultaneously rotating the tray rotary assembly and the intermediate rotary assembly to rotationally transfer the one or more items from the tray rotary assembly to the intermediate rotary assembly; removing, by the tray rotary assembly, the tray from the one or more items; moving an output rotary assembly of the tray content transfer system to a position above the intermediate rotary assembly; and simultaneously rotating the intermediate rotary assembly and the output rotary assembly to rotationally transfer the one or more items from the intermediate rotary assembly to the output rotary assembly.

In some embodiments, the one or more items are secured between the tray and a platform of the intermediate rotary assembly while the one or more items are rotationally transferred from the tray rotary assembly to the intermediate rotary assembly. In some embodiments, the one or more items are secured between a platform of the intermediate rotary assembly, a platform of the second rotary assembly, and a plurality of movable fingers while the one or more items are rotationally transferred from the intermediate rotary assembly to the output rotary assembly. In some embodiments, the method further includes moving the output rotary assembly to an output position in which a platform of the output rotary assembly is aligned with a shelf associated with an item processing apparatus. In some embodiments, the method further includes retracting one or more movable fingers of the output rotary assembly disposed between the one or more items and the shelf and sliding the one or more items along the output rotary assembly over the retracted fingers and onto the shelf. In some embodiments, a paddle assembly comprising one or more paddles disposed above the output rotary assembly slides the items onto the shelf. In some embodiments, the output rotary assembly comprises a plurality of movable fingers configured to support and contain the one or more first items, the method further including, prior to rotationally transferring the one or more items from the intermediate rotary assembly to the output rotary assembly, moving the movable fingers to a predetermined spacing to accommodate the one or more items. In some embodiments, the predetermined spacing is determined based at least in part on an adjusted spacing of a plurality of fingers of the intermediate rotary assembly. In some embodiments, the method is initiated based at least in part on a detection of the presence of the tray within the tray content transfer system.

BRIEF DESCRIPTION OF THE DRAWINGS

The foregoing and other features of the disclosure will become more fully apparent from the following description and appended claims, taken in conjunction with the accompanying drawings.

FIG. 2B is a rear perspective view of the tray content transfer system of FIG. 2A.

FIGS. 6A and 6B are perspective and side elevation views, respectively, of a fourth state of the tray content transfer system of FIG. 3 during the example tray content transfer process of FIGS. 3-5B.

DETAILED DESCRIPTION

Figure 1:
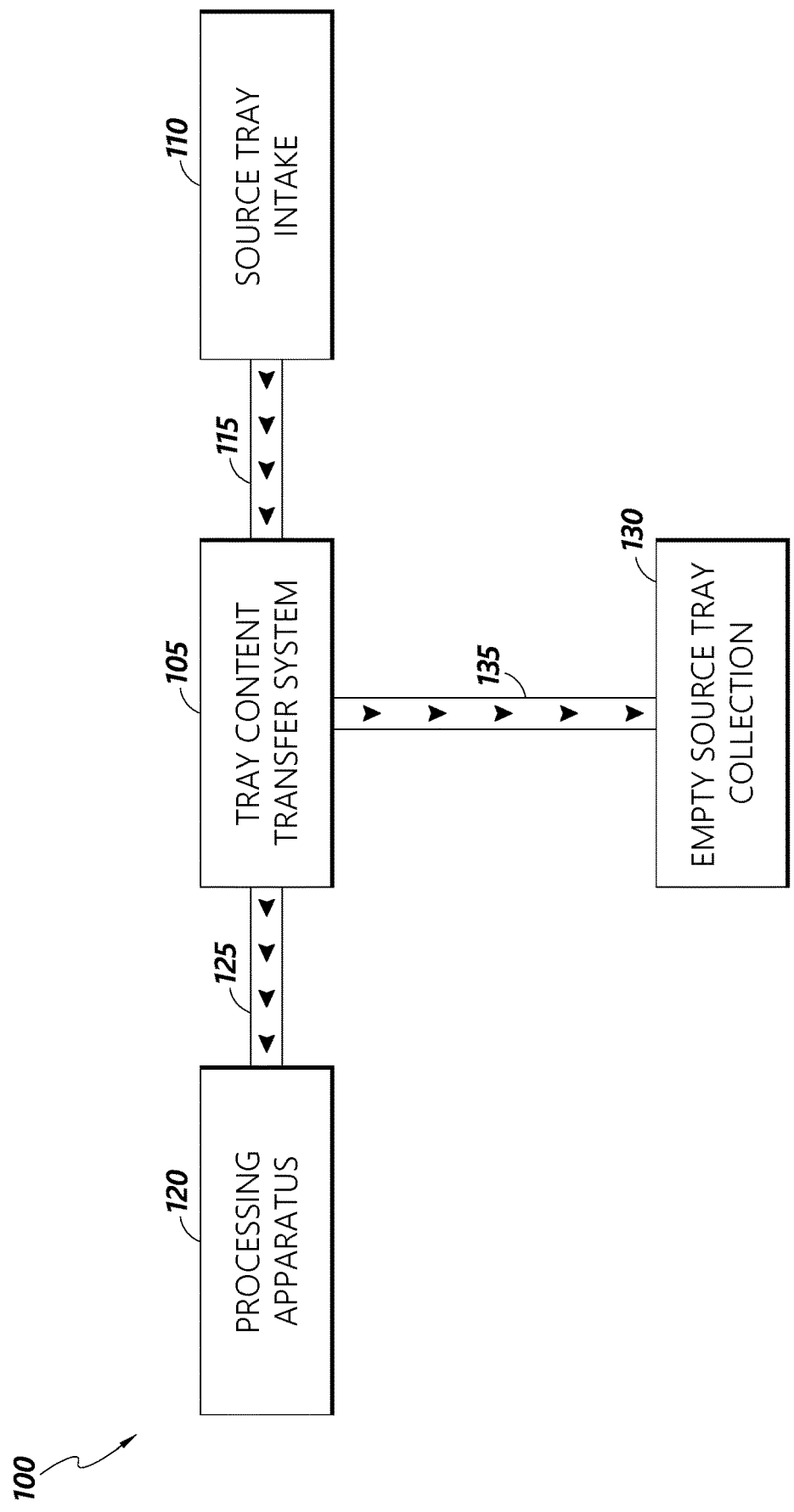
FIG. 1 is a schematic illustration of an example item processing system including a tray content transfer system.

In the following detailed description, reference is made to the accompanying drawings. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference in the specification to "one embodiment," "an embodiment", or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

In processing items in a distribution network, items can be transported in containers, such as trays. Items such as letters, postcards, envelopes, flats, or other types of stackable items may be received, transported, and processed in trays. When items are transported (e.g., between facilities or within a facility), they may be transported in trays, for example, as a stack of items within the tray. The trays may be optimized for transport of items outside of a processing facility (e.g., may be flexible, lightweight, inexpensive to manufacture, sized and shaped to fit in an item collection system, or the like), such as on an aircraft, a truck, or other vehicle. However, the trays may be unsuitable or unnecessary during processing of the items within a facility. For example, the items generally must be removed from the tray for processes such as sorting, facing, cancelling, or other processes. Thus, items received in a tray may need to be removed from the tray and transferred to one or more components or sections of an item processing system. For example, items may need to be transferred to a shelf and/or jogger which receives and aligns the items for processing by sorting equipment or the like.

Transferring items out of trays and into another item processing apparatus can be performed manually. Manual transfer of items from a tray to an item processing apparatus can be time-consuming and imprecise. Items may be dropped while being manually transferred, for example, while an operator is moving a horizontally oriented stack of letters by exerting an inward pressure on the ends of the stack. In another example, items such as letters may be received in a uniformly faced arrangement, and operator error during transfer may cause some of the letters to face the opposite direction after transfer, resulting in processing errors or delays.

The tray content transfer systems disclosed herein are configured to provide an automated process for transferring items or stacks of items out of a tray. In some embodiments, the tray content transfer systems may transfer items more reliably, efficiently, cost-effectively, and/or quickly than existing manual methods of tray content transfer. Although the present disclosure describes tray content transfer systems in the context of trays and flat items such as letter mail, it will be understood that other containers and items can be used without departing from the scope of the present disclosure.

Generally described, embodiments of the systems described herein use a sequence of motions to reliably and efficiently transfer items from a tray, such as a corrugated plastic tray, a letter tray, or other type of tray, to an item processing apparatus. For example, the items may be transferred from a letter tray to a machine such as a sorter, a jogger, a shelf, or the like. In some embodiments, a loaded tray is placed onto a tray rotary assembly within a tray content transfer system which is located proximate the item processing apparatus. An intermediate rotary assembly moves to a position above or partially within the loaded tray. The tray rotary assembly and the intermediate rotary assembly rotate together such that the tray is disposed above the intermediate rotary assembly, transferring the items onto the intermediate rotary assembly. The intermediate rotary assembly is moved away from the tray to a location where an output rotary assembly can be positioned above the items on the intermediate rotary assembly. The items may then be rotationally transferred to the output rotary assembly, which can transfer the items to processing equipment. The transfer sequences disclosed herein can allow the transfer system to move articles such as letters, flats, parcels, and the like. In some embodiments, the system described herein can advantageously move items from a tray to an item processing apparatus without lifting or suspending the articles over a space, gap, or area between the tray and the item processing apparatus, where articles may be lost or damaged if dropped.

FIG. 1 schematically illustrates an example item processing system 100 including a tray content transfer system 105. The item processing system 100 further includes a source tray intake 110, a processing apparatus 120, and an empty source tray collection 130. Trays can be transferred between the components of the item processing system 100 by an intake flow path 115 and an empty source tray flow path 135. Items can pass from the tray content transfer system 105 to the processing apparatus 120 by an output flow path 125. Each of the flow paths 115, 125, 135 can be a conveyor, such as a moving conveyor belt surface, a series of rollers, or any other conveying system configured to move one or more trays laterally and/or vertically. In some embodiments, the output flow path 125 may include a horizontal or sloped surface such as a shelf and one or more paddles or other movable elements configured to slide items along the horizontal or sloped surface.

The source tray intake 110 can include one or more devices or systems for providing item-containing trays. For example, the source tray intake 110 can include a loading dock where item-containing trays are received from transport vehicles for processing. In some embodiments, the source tray intake 110 can be an output of another process to be performed before tray content transfer. For example, in some letter mail processing embodiments, the source tray intake 110 may include a facer-canceler system configured to apply a cancellation to letters and place the letters in a uniformly faced horizontal stack within source trays.

The processing apparatus 120 can include one or more devices or systems for processing the items after tray content transfer. For example, the processing apparatus 110 can include any number of machines, such as mail processing equipment, configured to scan, image, weigh, measure, sort, order, combine, separate, analyze, or otherwise process the items. In some letter mail processing embodiments, the processing apparatus 110 can include one or more machines for automatically reading information provided on the letters (e.g., postage information, destination address, return address, etc.) and/or sorting the letters for further transportation according to item type and/or destination, or other criteria. In some letter mail processing embodiments, the processing apparatus 120 may include a sorter/sequencer system configured to sort the letters into stop groups and sequence the letters into delivery sequence order.

The empty source tray collection 130 can include one or more lines, piles, stacks, carts, dispensers, receivers, or other structures capable of holding a plurality of trays. For example, the empty source tray collection 130 may include a tray receiving system located at an end of the empty source tray flow path 135 for receiving and stacking or otherwise organizing empty source trays to be reused for transporting additional items.

In an example method of operation, the tray content transfer system 105 receives a first item-containing tray from the processing apparatus 110 from the source tray intake 110 via the intake flow path 115. At the tray content transfer system 105, the items in the tray are transferred from the tray to the output flow path 125. After the transfer, the items travel to the processing apparatus 120 via the output flow path 125. The empty tray is sent to the empty source tray collection 130 via the empty source tray flow path 135. After the tray leaves the tray content transfer system 105, the example method can be repeated with a second item-containing tray. As will be described in greater detail, some embodiments may be configured to receive a second item-containing tray and begin the content transfer process before the content transfer process is completed for the first item-containing tray, providing enhanced throughput and efficiency.

The example method described above with reference to FIG. 1 can be repeated any number of times or indefinitely, for example, based on a desired number or rate of item-containing trays received for processing. In some embodiments, the tray content transfer system 105 can be configured to transfer the contents of two or more trays to a single processing apparatus, to transfer the contents of a single tray to two or more item processing apparatuses, or to transfer the contents of two or more trays to two or more item processing apparatuses simultaneously. In addition, various components of the item processing system 100 can be automated and/or performed manually. For example, any of the flow paths 115, 125, 135 can be performed manually at least in part, such as by an operator manually placing one or more loaded or empty trays onto a conveyor or directly into the tray content transfer system 105.

Figure 2A:
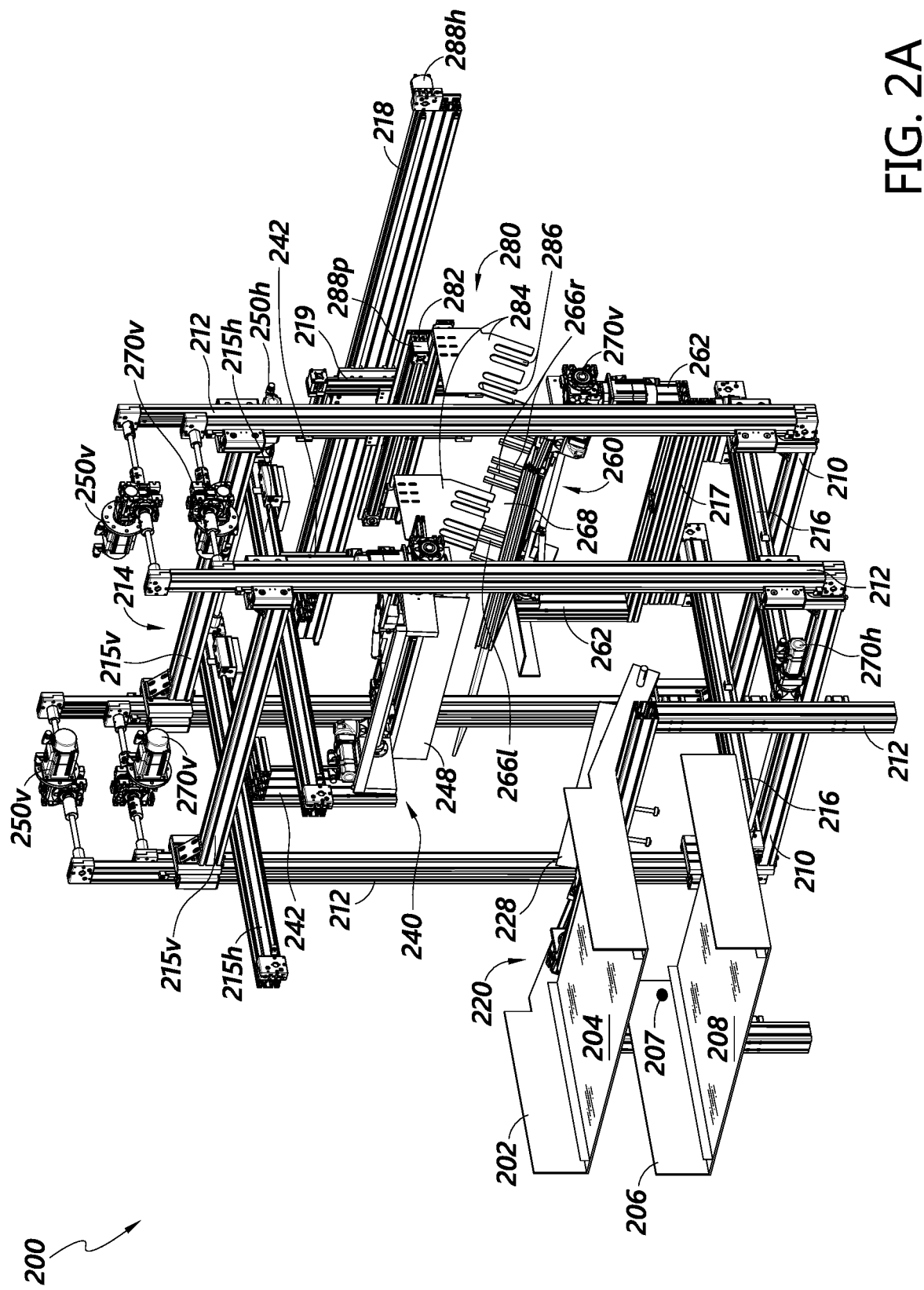
FIG. 2A is a front perspective view of an example tray content transfer system.
Figure 2C:
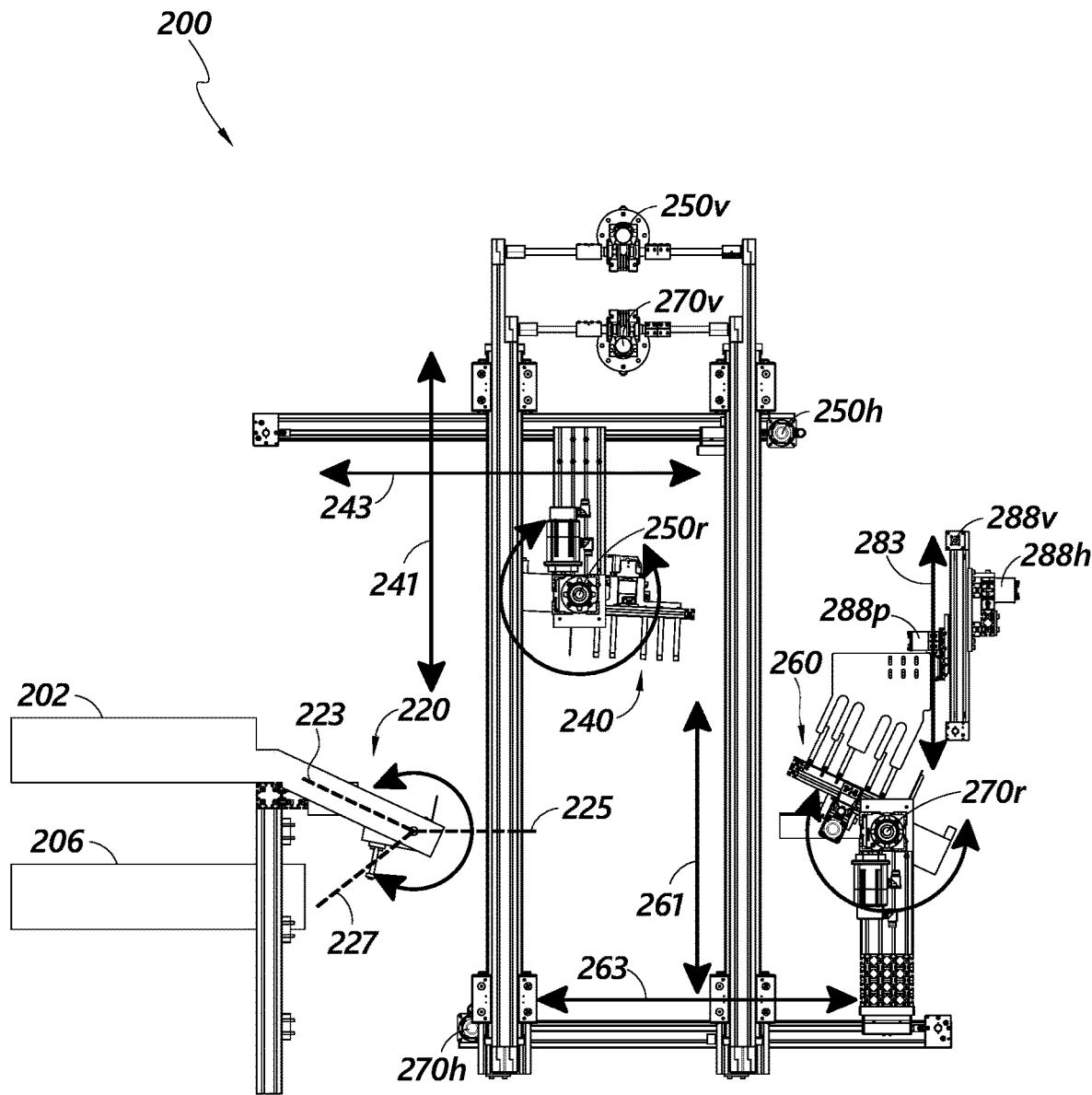
FIG. 2C is a right side elevation view of the tray content transfer system of FIGS. 2A and 2B showing axes of motion of the tray content transfer system.
Figure 2D:
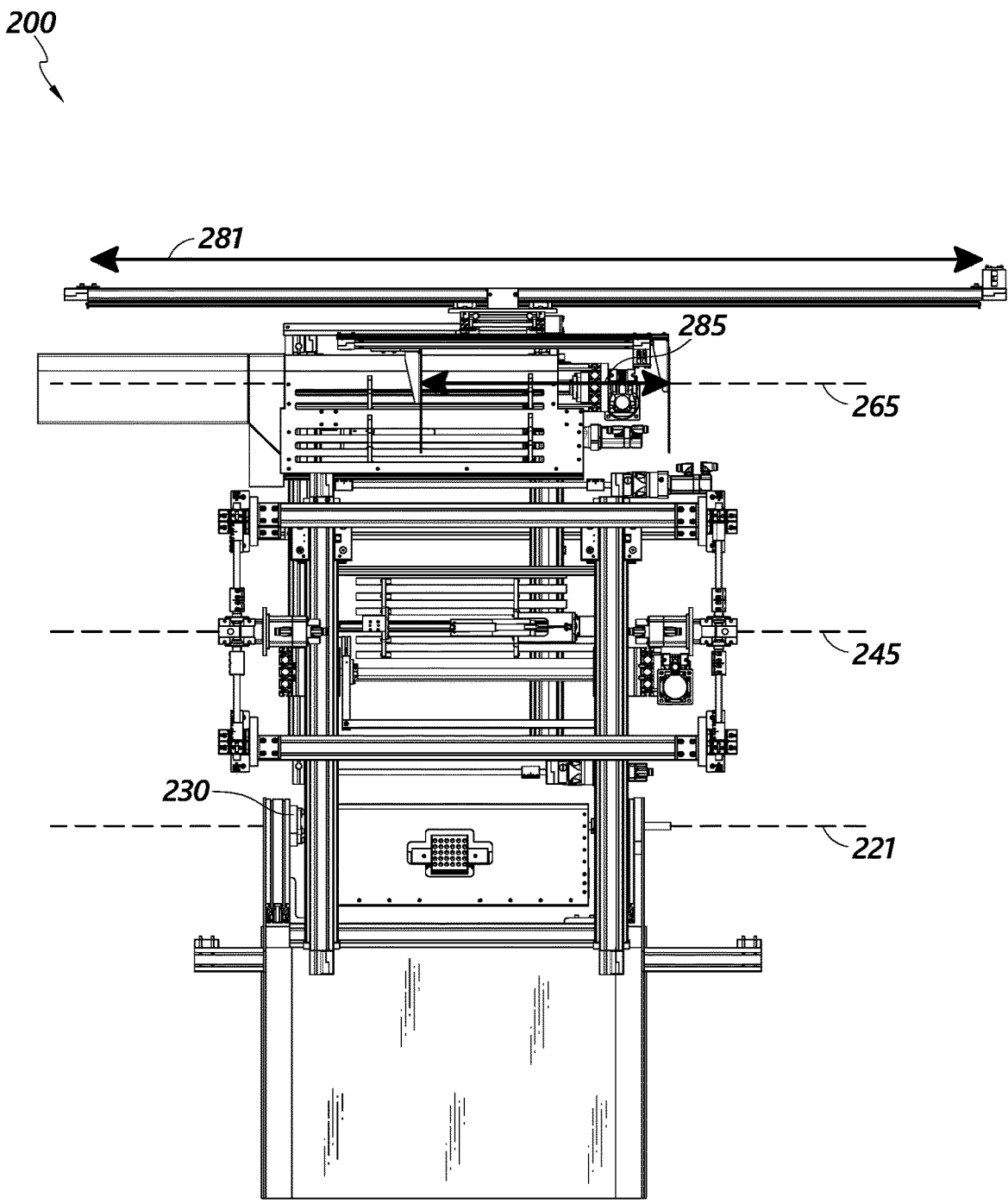
FIG. 2D is a top plan view of the tray content transfer system of FIGS. 2A-2C showing axes of motion of the tray content transfer system.

FIGS. 2A-2D depict a tray content transfer system 200 in accordance with an example embodiment. FIGS. 2A and 2B are front and rear perspective views, respectively, of the tray content transfer system 200 in an empty state. FIGS. 2C and 2D are side elevation and top plan views, respectively, of the tray content transfer system 200 illustrating axes of motion of various components of the tray content transfer system 200. The tray content transfer system 200 generally includes a frame 210, as well as a tray rotary assembly 220, an intermediate rotary assembly 240, an output rotary assembly 260, and a paddle assembly 280, each movably mounted at least partially within the frame 210. The tray content transfer system 200 is configured to receive item-containing trays from a tray input 202, to transfer the items from the trays to an output location such as a shelf 290, and to transfer the empty trays via a tray output 206.

In some embodiments, the tray input 202 includes an input conveyor 204 configured to move an item-containing tray when the tray is at least partially on the input conveyor 204. The tray output 206 may similarly include an output conveyor 208 configured to slide an empty tray when the tray is at least partially on the output conveyor 208. The input conveyor 204 and the output conveyor 208 may operate intermittently and/or continuously. For example, the input conveyor 204 may operate intermittently so as to provide item-containing trays to the tray content transfer system 200 only when the tray content transfer system 200 is ready to receive a tray. In other embodiments, the input conveyor 204 may operate continuously with the item-containing trays spaced along the conveyor to provide a predetermined time spacing between consecutive trays. The output conveyor 208 may operate continuously such that any empty trays deposited into the tray output 206 are transported away from the tray content transfer system. In other embodiments, the output conveyor 208 may operate intermittently and the operation of the output conveyor 208 may be triggered based on, for example, rotation of the tray rotary assembly 220 and/or based on detecting a tray at a sensor 207 (e.g., a photoelectric sensor or light gate, a proximity sensor, or the like) of the tray output 206.

The frame 210 is generally configured to provide a stable support for the tray rotary assembly 220, the intermediate rotary assembly 240, and the output rotary assembly 260. The frame 210 includes various structural members 212 arranged to form a substantially rigid frame structure. The frame 210 includes an intermediate rotary assembly sub-frame 214, an output rotary assembly sub-frame 216, and a paddle assembly sub-frame 218. In various embodiments, the frame 210 can be any size, shape, or configuration suitable to support the various components of the tray content transfer system 200. For example, the frame 210 can be built into a wall, a shelf, a floor, or the like, and need not be a free-standing frame as shown in the figures. The frame 210 may be a single frame structure or may comprise multiple frame sections, some of which may be discrete frame sections not connected to one or more other sections of the frame 210.

The tray rotary assembly 220 generally includes tray rotary assembly arms 222, a platform 224 rotatably mounted between the tray rotary assembly arms 222, a tray retainer 226, and a tray support guide 228. The tray retainer 226 is configured to retain a tray against the platform 224. In some embodiments, the tray retainer 226 includes a suction device disposed to exert a suction force against a bottom surface of a tray to retain the tray (e.g., when the platform 224 is rotated such that the tray is below the platform 224). In other embodiments, the tray retainer 226 may include one or more mechanical arms, stoppers, or the like configured to retain a tray by a friction fit or by mechanically restraining the tray. The tray support guide 228 extends from the platform 224 at a first end to support items and/or a tray during rotation of the tray rotary assembly.

The intermediate rotary assembly sub-frame 214 is generally configured to support and accommodate motion of intermediate rotary assembly arms 242 to which the intermediate rotary assembly 240 is mounted. Vertical translation members 215$v$ of the intermediate rotary assembly sub-frame 214 are slidably mounted to vertical structural members 212, such that they can slide up and down relative to the frame 210 to cause vertical movement of the intermediate rotary assembly 240. Horizontal translation members 215$h$ of the intermediate rotary assembly sub-frame 214 are slidably mounted to the vertical translation members 215$v$, such that they can slide horizontally along the vertical translation members 215$v$ to cause horizontal movement of the intermediate rotary assembly 240. Movement of the intermediate rotary assembly 240 is discussed in greater detail with reference to FIGS. 2C and 2D.

The intermediate rotary assembly 240 generally includes a platform 244 rotatably mounted between the intermediate rotary assembly arms 242, as well as left fingers 246*l* and right fingers 246*r* retractably extendable through corresponding slots 252 in the platform 244. An item support guide 248 extends from the platform 244 at a first end to support items during rotation of the intermediate rotary assembly 240. The intermediate rotary assembly is discussed in greater detail with reference to FIG. 2E.

The output rotary assembly sub-frame 216 is generally configured to support and accommodate motion of output rotary assembly arms 262 to which the output rotary assembly 260 is mounted. The output rotary assembly sub-frame 216 is slidably mounted to vertical structural members 212, such that the output rotary assembly sub-frame 216 can slide up and down relative to the frame 210 to cause vertical movement of the output rotary assembly 260. A horizontal translation member 217 of the output rotary assembly sub-frame 216 is slidably mounted to the output rotary assembly sub-frame 216, such that the horizontal translation member 217 can slide horizontally along the output rotary assembly sub-frame 216 to cause horizontal movement of the output rotary assembly 260. Movement of the output rotary assembly 260 is discussed in greater detail with reference to FIGS. 2C and 2D.

The output rotary assembly 260 generally includes a platform 264 rotatably mounted between the output rotary assembly arms 262, as well as left fingers 266*l* and right fingers 266*r* retractably extendable through corresponding slots 272 in the platform 264. An item support guide 268 extends from the platform 264 at a first end to support items during rotation of the output rotary assembly 260. The output rotary assembly is discussed in greater detail with reference to FIG. 2F.

The paddle assembly sub-frame 218 is generally configured to support and accommodate motion of the paddle assembly 280. A horizontal translation member 219 is slidably mounted to the paddle assembly sub-frame 218, such that the horizontal translation member 219 can slide horizontally relative to the paddle assembly sub-frame 218 to cause horizontal movement of the paddle assembly 280. A paddle assembly base 282 of the paddle assembly 280 is slidably mounted to the horizontal translation member 219, such that the paddle assembly base 282 can slide up and down relative to the horizontal translation member to cause vertical movement of the paddle assembly 280. Movement of the paddle assembly 280 is discussed in greater detail with reference to FIGS. 2C and 2D.

The paddle assembly 280, as shown in FIGS. 2A-2B, includes two paddles 284, each paddle including a plurality of paddle fingers 286. One or both of the paddles 284 can be slidably mounted along the paddle assembly base 282 such that the paddles 284 can be moved relatively closer together or farther apart to engage or release items located between the paddles 284. The paddle assembly 280 can be made of any substantially rigid material, for example, a metal such as sheet aluminum or steel, a hard plastic, or the like. A paddle motor 288*p* may slide the paddles 284 to increase or decrease the distance between the paddles 284.

Each paddle 284 is a generally planar surface disposed perpendicular to the paddle assembly base 282. The paddles 284 include paddle fingers 286 spaced along the paddles 284 and generally extending downward from the paddles 284. The paddle fingers 286 can be sized and shaped to mesh with or otherwise fit between the fingers 266*l* and fingers 266*r* of the output rotary assembly 260 when the platform 264 of the output rotary assembly 260 is disposed below and aligned with the paddle assembly 280. As will be described in greater detail with reference to FIGS. 13-16, the paddles 284 can thus be used to slide items from the output rotary assembly 260 onto a shelf 290 or other adjacent location.

FIG. 2C is a side view of the tray content transfer system 200, and FIG. 2D is a top view of components of the tray content transfer system 200. With reference to FIGS. 2C and 2D, the components described above with reference to FIGS. 2A and 2B can move by translation along and/or rotation about various axes with reference to the frame 210. The tray rotary assembly 220 is rotatable about a rotational axis 221, for example, between an intake position 223 for receiving a tray from the tray input 202, a transfer position 225 for rotationally transferring items from the tray to the intermediate rotary assembly 240, and an output position 227 for releasing the empty tray to the tray output 206. Rotation of the tray rotary assembly 220 about the rotational axis 221 can be controlled by a tray rotary assembly motor 230.

The intermediate rotary assembly 240 is translatable along a vertical axis 241 (e.g., by translation of the vertical translation members 215*v* along the vertical structural members 212) and along a horizontal axis 243 (e.g., by translation of the horizontal translation members 215*h* along the vertical translation members 215*v*). The intermediate rotary assembly 240 is rotatable about a rotational axis 245. Translation of the intermediate rotary assembly 240 along the vertical axis 241 may be controlled by one or more intermediate rotary assembly vertical motors 250*v*. Translation of the intermediate rotary assembly 240 along the horizontal axis 243 may be controlled by one or more intermediate rotary assembly horizontal motors 250*h*. Rotation of the intermediate rotary assembly 240 about the rotational axis 245 can be controlled by an intermediate rotary assembly rotational motor 250*r*.

The output rotary assembly 260 is translatable along a vertical axis 261 (e.g., by translation of the output rotary assembly sub-frame 216 along the vertical structural members 212) and along a horizontal axis 263 (e.g., by translation of the horizontal translation member 217 along the output rotary assembly sub-frame 216). The output rotary assembly 260 is rotatable about a rotational axis 265. Translation of the output rotary assembly 260 along the vertical axis 261 may be controlled by one or more output rotary assembly vertical motors 270*v*. Translation of the output rotary assembly 260 along the horizontal axis 263 may be controlled by one or more output rotary assembly horizontal motors 270*h*. Rotation of the output rotary assembly 260 about the rotational axis 265 can be controlled by an output rotary assembly rotational motor 270*r*.

The paddle assembly 280 is translatable along a horizontal axis 281 (e.g., by translation of the horizontal translation member 219 along the paddle assembly sub-frame 218) and along a vertical axis 283 (e.g., by translation of the paddle assembly base 282 along the horizontal translation member 219). One or both of the paddles 284 may be translatable along a paddle axis 285 parallel to the horizontal axis 281 to engage (e.g., to squeeze or retain) items disposed between the paddles 284. Translation of the paddle assembly 280 along the horizontal axis 281 may be controlled by one or more paddle assembly horizontal motors 288*h*. Translation of the paddle assembly 280 along the vertical axis 283 may be controlled by one or more paddle assembly vertical motors 288*v*. Translation of one or both paddles 284 may be controlled by one or more paddle motors 288*p*.

Figure 2E:
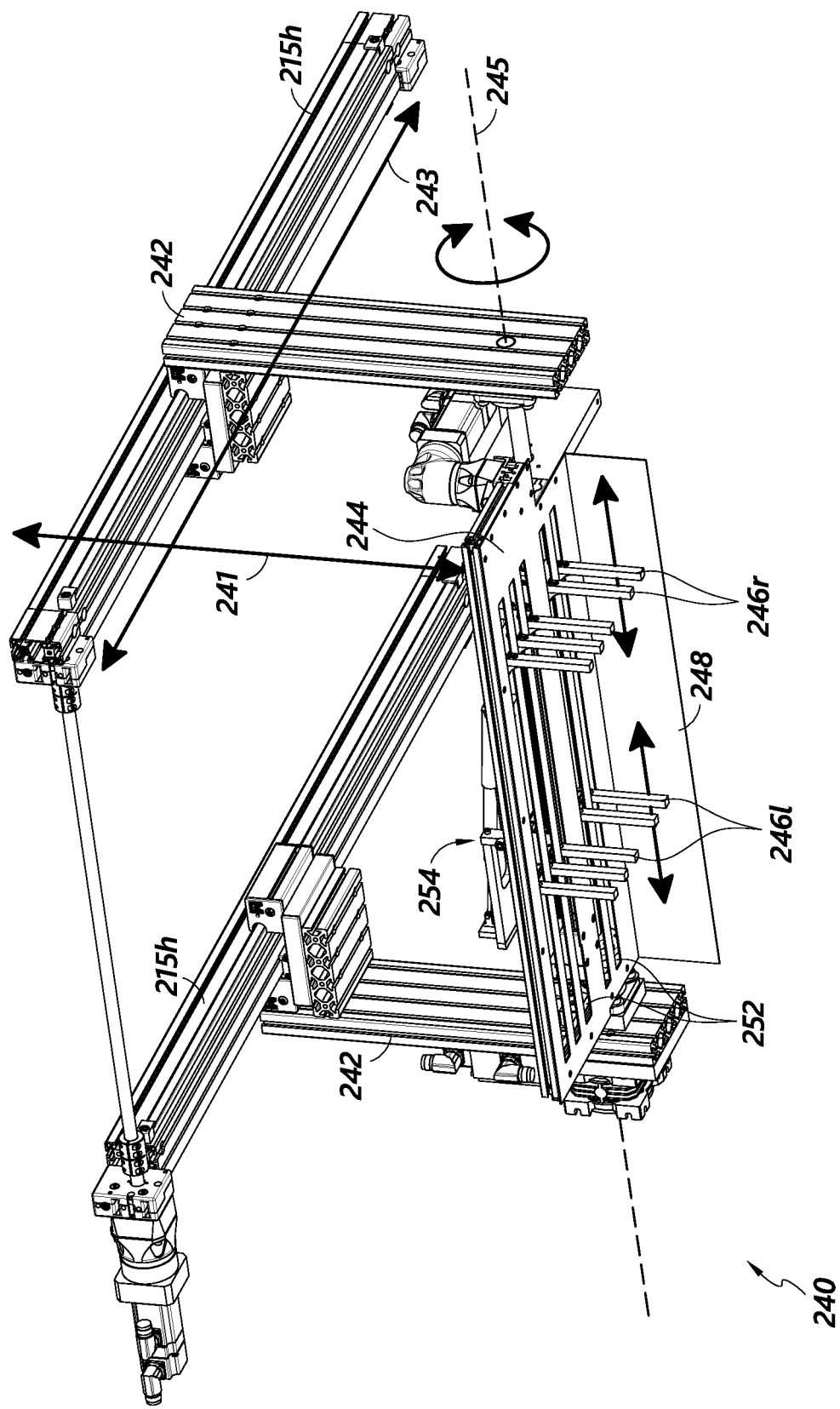
FIG. 2E is a perspective view of an intermediate rotary assembly of the tray content transfer system of FIGS. 2A-2D.

FIG. 2E is an enlarged perspective view depicting the intermediate rotary assembly 240 as shown in FIGS. 2A-2D. As described above, the intermediate rotary assembly 240 is configured for translational and rotational motion to transfer items from a tray. The platform 244 and item support guide 248 are mounted rotatably about rotational axis 245. Fingers 246l and 246r are slidably mounted to the intermediate rotary assembly 240 such that each finger 246l, 246r extends through one of the slots 252 in the platform 244. Fingers 246l and 246r can slide longitudinally along the slots 252 while remaining substantially perpendicular to the platform 242. An intermediate finger motor 254 or motors control the translational motion of the fingers 246l, 246r along the slots 252 and may be configured to precisely control the spacing between fingers 246l and fingers 246r. In some embodiments, all of fingers 246l may be movable as a single unit, and all of fingers 246r may be movable as a single unit.

Figure 2F:
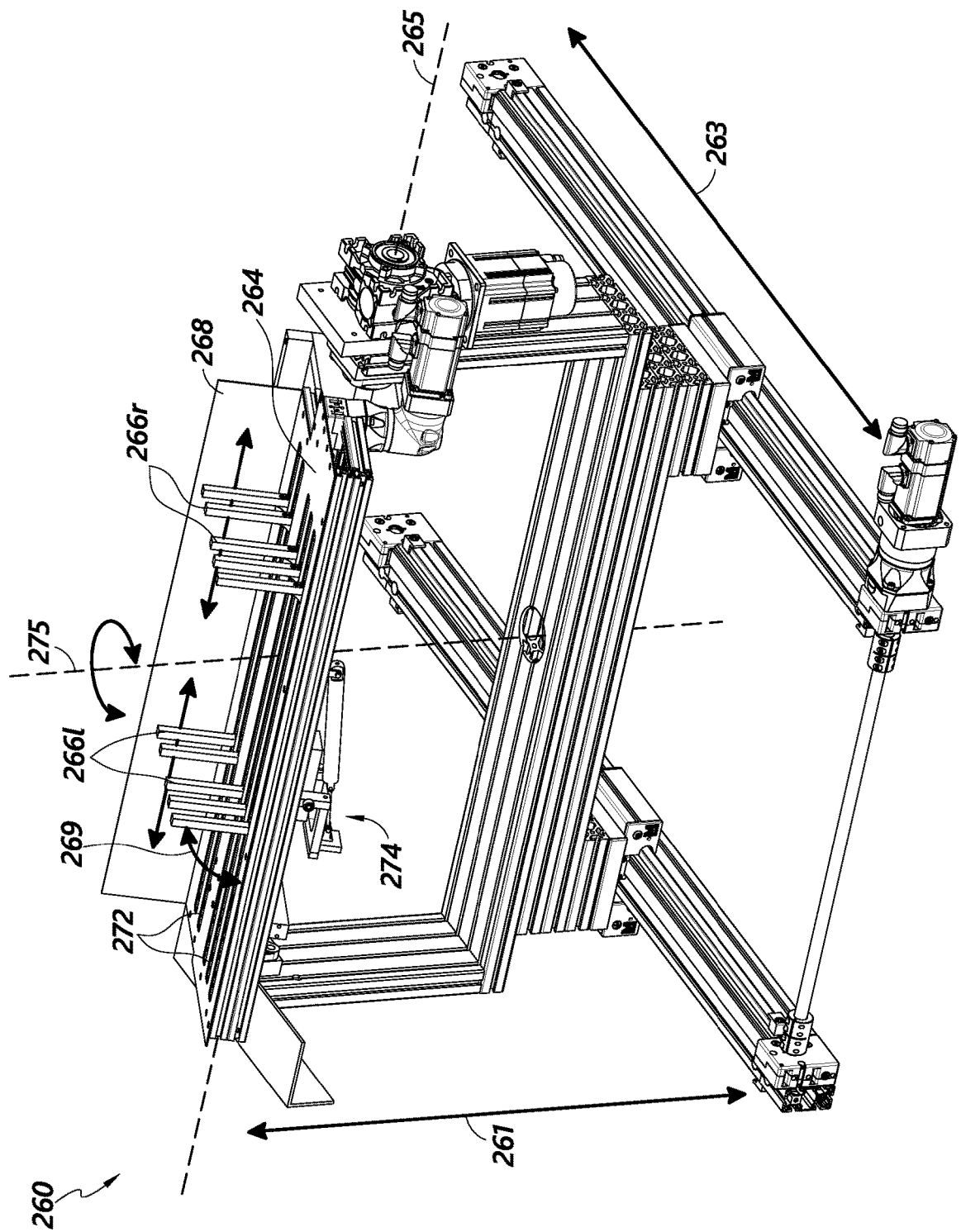
FIG. 2F is a perspective view of an output rotary assembly of the tray content transfer system of FIGS. 2A-2D.

FIG. 2F is an enlarged perspective view depicting an embodiment of the output rotary assembly 260 as shown in FIGS. 2A-2D which can rotate about a vertical axis depending on a required orientation for the stack of items relative to a piece of item processing equipment. The features described herein with regard to FIG. 2F can be included, but need not be present. As described above, the output rotary assembly 260 is configured for translational and rotational motion to receive items from the intermediate rotary assembly 240 and to transfer the items to an output location such as a shelf or other output location. The platform 264 and item support guide 268 are mounted rotatably about rotational axis 265. Fingers 266l and 266r are slidably mounted to the output rotary assembly 260 such that each finger 266l, 266r extends through one of the slots 272 in the platform 264. Fingers 266l and 266r can slide longitudinally along the slots 272 while remaining substantially perpendicular to the platform 264. In addition, in some embodiments the left fingers 266l are retractable (e.g., tiltable) as indicated by arrow 269. The left fingers 266l may be tiltable along a range of motion extending from perpendicular to the platform as shown in FIG. 2F to a lowered position in which the tips of the left fingers 266l do not extend or extend a shorter distance (e.g., up to 0.5 inches or less) through the slots 272. The lowered position, in which the left fingers 266l do not extend or do not substantially extend above the platform 264, facilitates the sliding of items along the platform 264 such as to transfer the items from the output tray assembly 260 to an adjacent shelf or other item receiving structure. An output finger motor 274 or motors control the translational motion of the fingers 266l, 266r along the slots 272, as well as the tilting motion of the left fingers 266l, and may be configured to precisely control the spacing between fingers 266l and fingers 266r. In some embodiments, all of fingers 266l may be movable as a single unit, and all of fingers 266r may be movable as a single unit. In some embodiments, the output rotary assembly 260 may further be rotatable about a vertical axis 275, such that the output rotary assembly 260 may rotate to deliver items from the platform 264 to a shelf or other item receiving location that has a different orientation relative to the output rotary assembly 260.

With reference to FIGS. 2C-2F, motion of any of the moving parts described herein, for example, horizontal translation along axes 243, 263, and 281, vertical translation along axes 241, 261, and 283, rotation about axes 221, 245, and 265, and/or movement of any of the fingers and/or paddles described above, can be driven by any number of motors, electromechanical or pneumatic device, etc., and can be selectively controlled and/or inhibited by mechanical or pneumatic brakes configured to stop and/or prevent motion along any of the movement axes described herein. The motors and/or brakes can be controlled by one or more controllers, which may include computer components such as one or more processors, memory or other storage media, network or other communication interfaces, and/or other circuitry. In some embodiments, a memory of the controller stores computer-executable instructions that, when executed by the processor and/or other circuitry of the controller, directly or indirectly cause the motors and/or brakes to move in a predetermined sequence. The predetermined sequence can include, for example, a tray content transfer process such as the process described below with reference to FIGS. 3-16.

FIGS. 3-16 sequentially illustrate an example process for transferring the contents of a tray 301 from the tray 301 to a shelf 290 (visible in FIG. 4A) using a tray content transfer system 200 as disclosed herein. Although the process of FIGS. 3-16 is shown and described in the context of the tray content transfer system 200 depicted in FIGS. 2A-2F, it will be appreciated that the same or similar steps may be implemented in another tray content transfer system.

Figure 3:
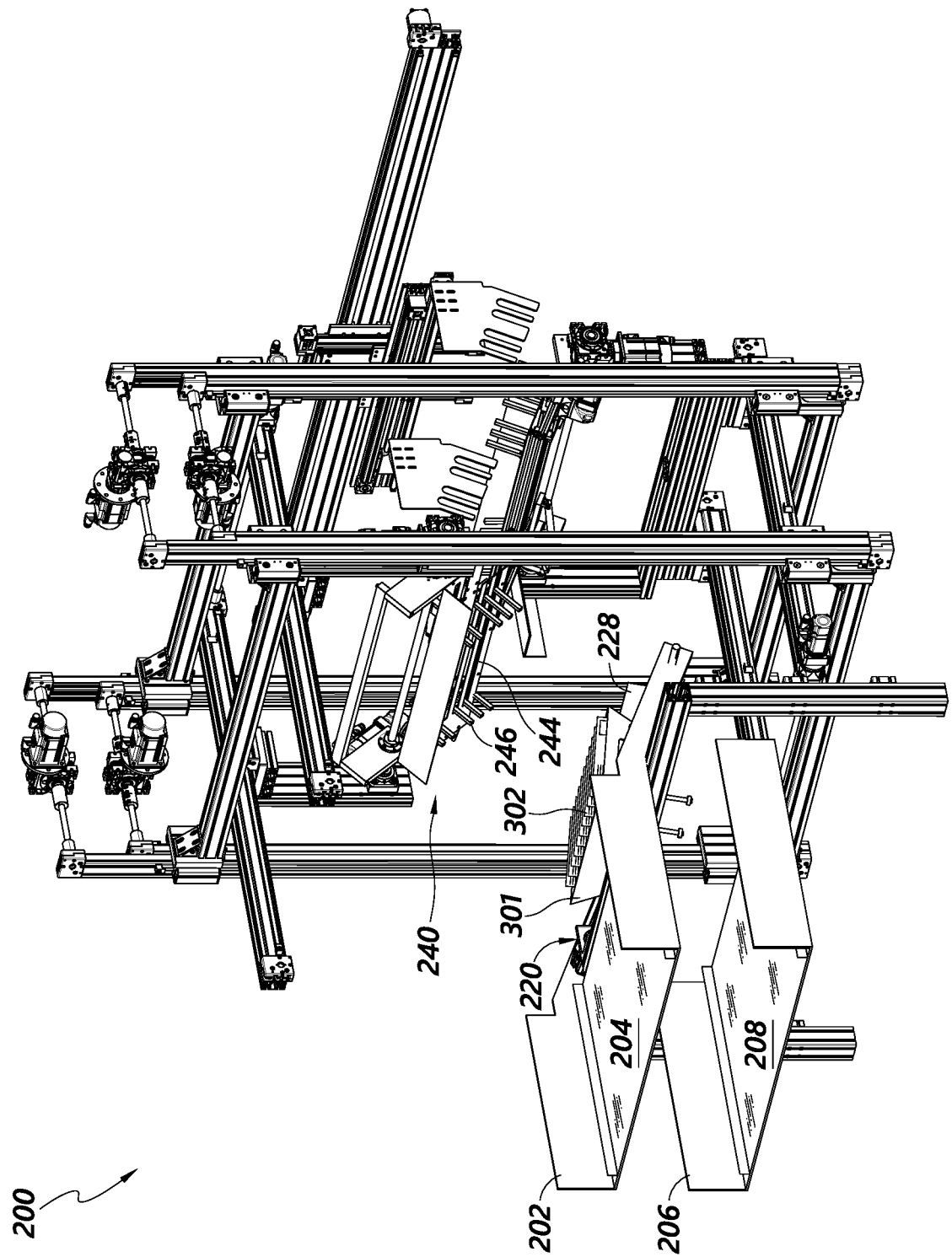
FIG. 3 is a perspective view of an initial state of a tray content transfer system during an example tray content transfer process.

FIG. 3 depicts an initial state of the tray content transfer process. In the initial state, a tray 301 contains items 302. The items can be, for example, letters, flats, etc., and may be organized in a stack as shown in FIG. 3. In the initial state of FIG. 3, the tray 301 has been received on the tray rotary assembly 220. The tray 301 may be placed onto the tray rotary assembly 220 manually or automatically, for example, being moved onto the tray rotary assembly 220 from the tray input 202 by the input conveyor 204 and/or any other combination of conveyors, rollers, ramps, robotic arms, paddles, pushers, or other automated tray placement mechanism, or manually by an operator. One or more alignment features may facilitate correct positioning of the tray 301 on the tray rotary assembly 220. Alignment features may include, for example, one or more mechanical stops located on or adjacent to the tray rotary assembly 220. The intermediate rotary assembly 240 is located away from the tray rotary assembly 220 so as not to impede placement of the tray 301.

In an example tray content transfer process, the tray 301 is a corrugated plastic postal letter tray for the transportation of letter mail or flats. The items 302 stacked within the tray 301 are to be transferred to the shelf 290. In some embodiments, the items 302 may already be uniformly faced (that is, selectively flipped such that the postage and address of each item in the stack faces the same direction). Thus, it is desirable for the tray content transfer process to maintain the uniform facing of the items 302 during transfer and to avoid dropping or unstacking any of the items 302.

Figure 4A:
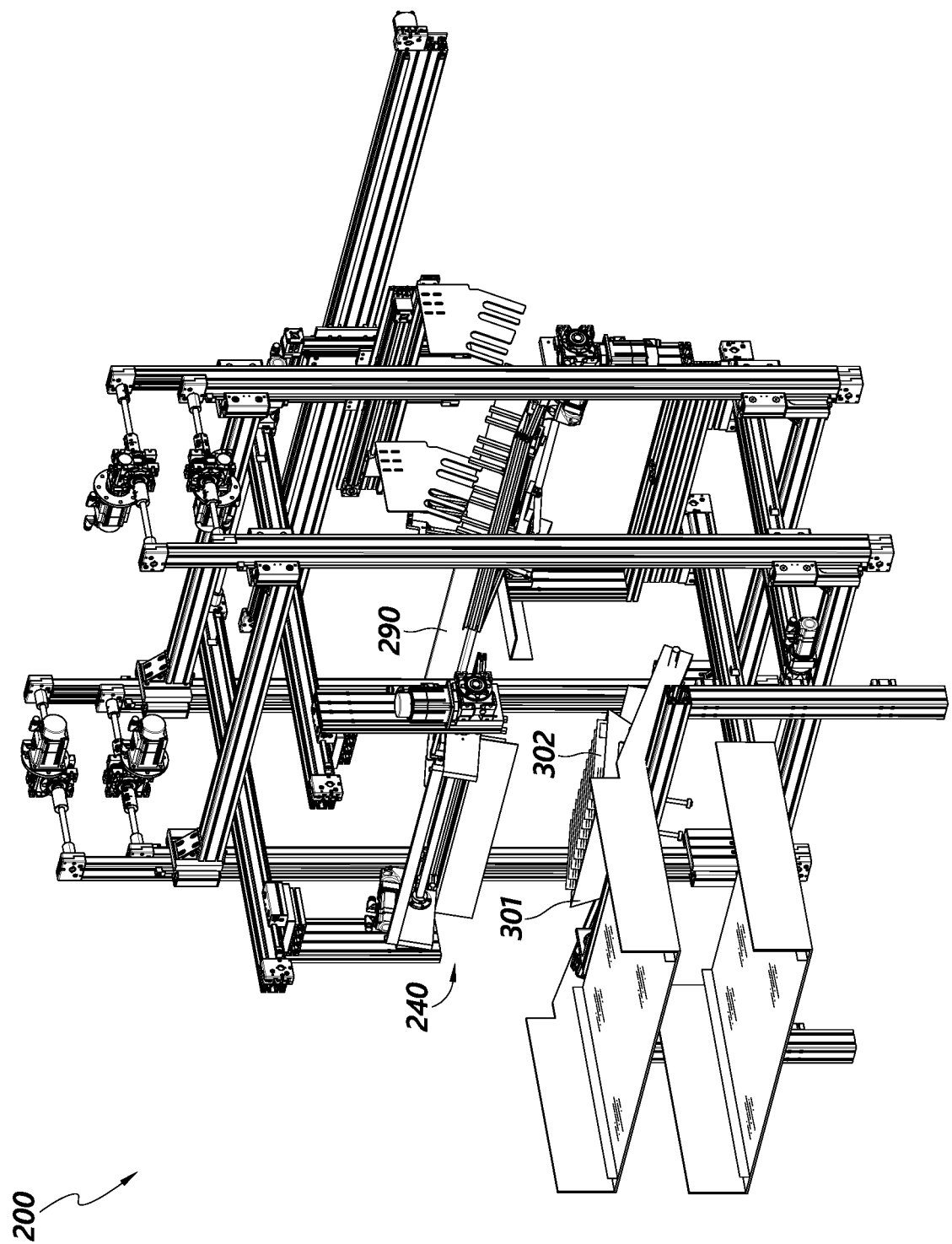
FIGS. 4A and 4B are perspective and side elevation views, respectively, of a second state of the tray content transfer system of FIG. 3 during the example tray content transfer process of FIG. 3.
Figure 4B:
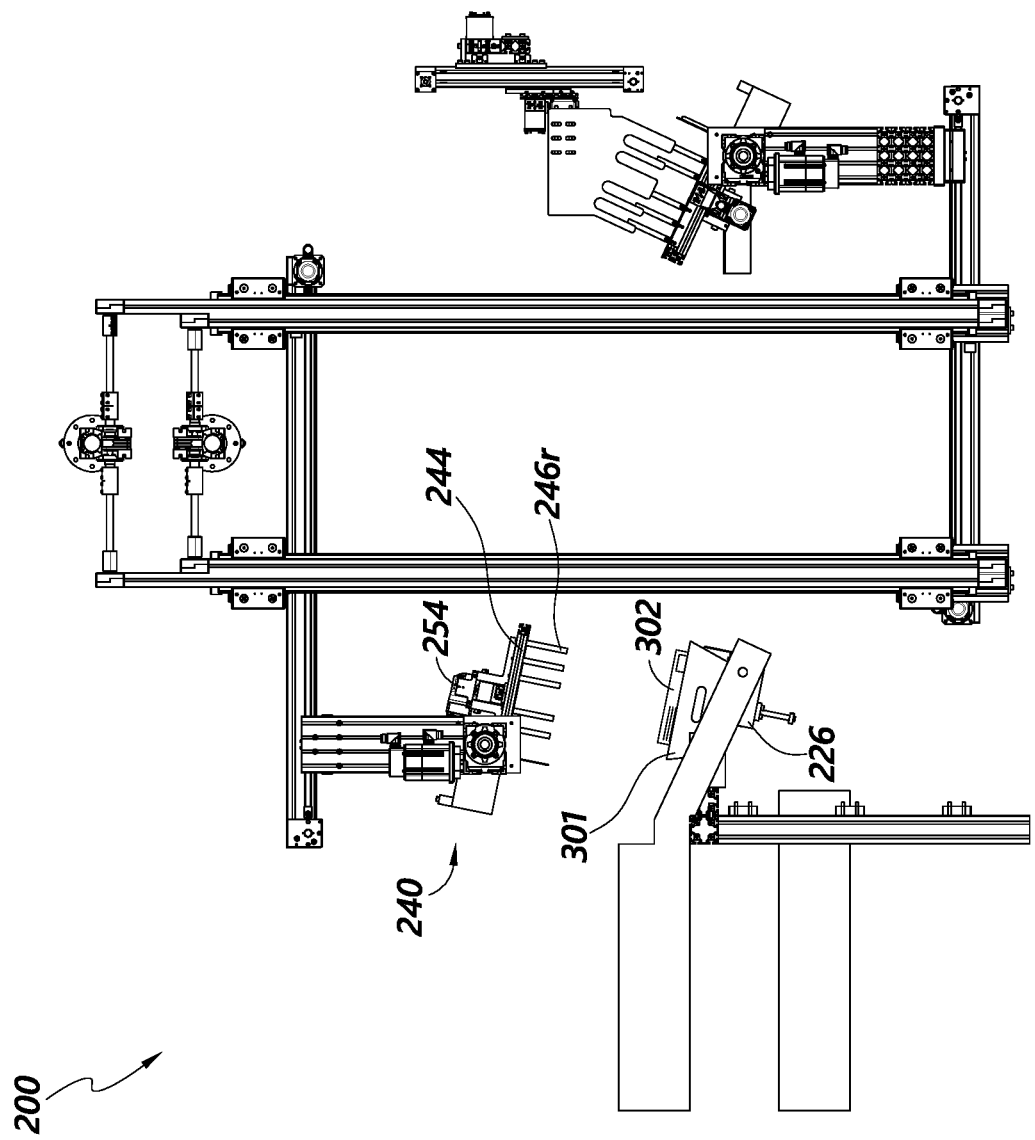

After the tray 301 is received within the tray content transfer system 200, the process continues to the configuration shown in FIGS. 4A and 4B. As shown in FIGS. 4A and 4B, the intermediate rotary assembly 240 is translated vertically and/or horizontally to a position above the tray 301. The intermediate rotary assembly 240 is rotated such that the platform 244 is substantially parallel to the platform 224 of the tray rotary assembly. The fingers 246l, 246r of the intermediate rotary assembly may also be translated horizontally along the platform 244 by intermediate finger motor 254 such that they are spaced appropriately to accommodate the items 302 in the tray 301. For example, in some embodiments the left fingers 246l may be spaced from the right fingers 246r by a distance slightly larger than the width of the tray 301 such that the entire tray fits between the left fingers 246l and the right fingers 246r. In other embodiments, the spacing may be slightly narrower such that the left fingers 246*l* and the right fingers 246*r* can fit between the items 302 and the sidewalls of the tray 301. At this stage, the tray retainer 226 may be activated to apply suction so as to retain the tray 301 in its position against the platform 222 of the tray rotary assembly 220.

Figure 5A:
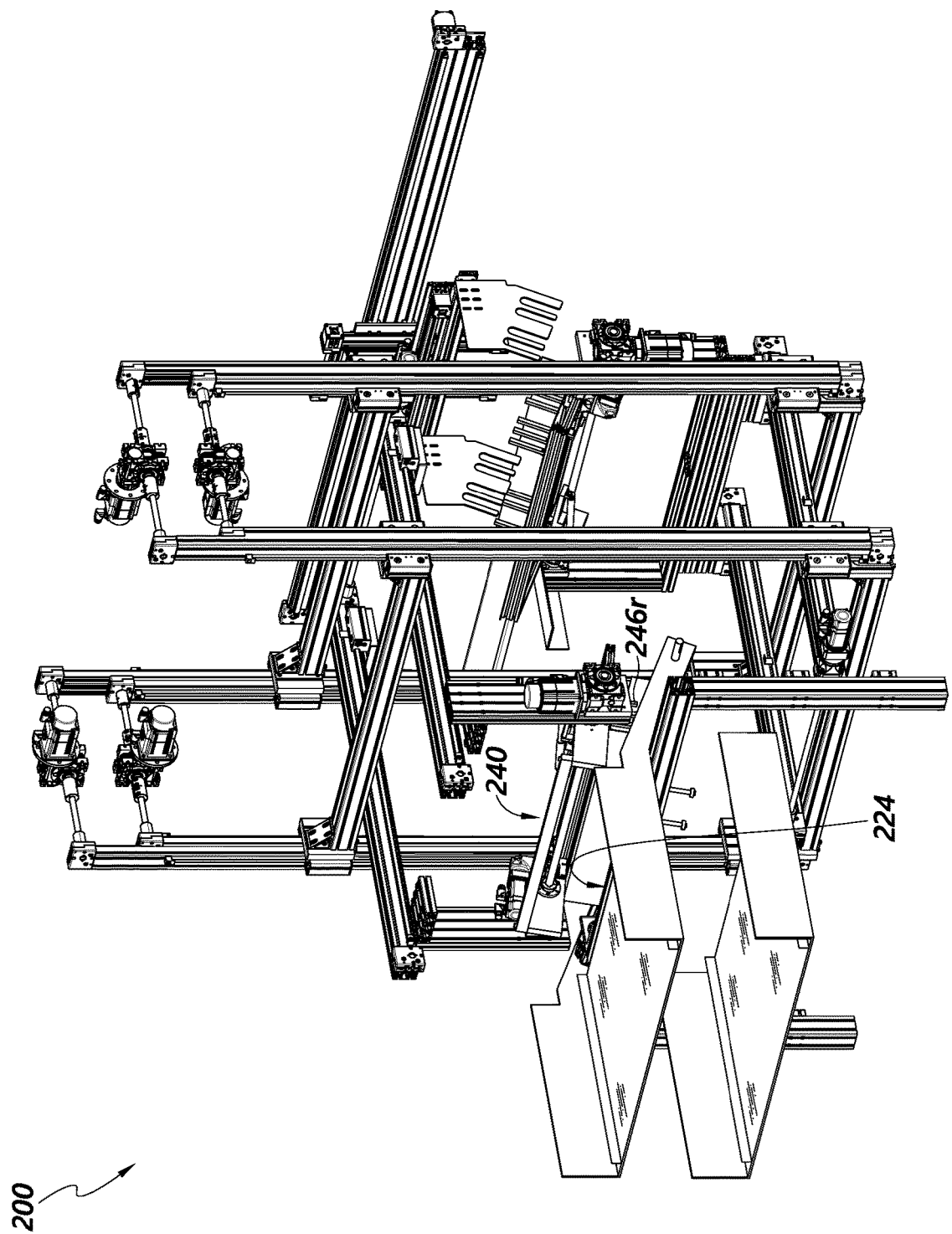
FIGS. 5A and 5B are perspective and side elevation views, respectively, of a third state of the tray content transfer system of FIG. 3 during the example tray content transfer process of FIGS. 3-4B.
Figure 5B:
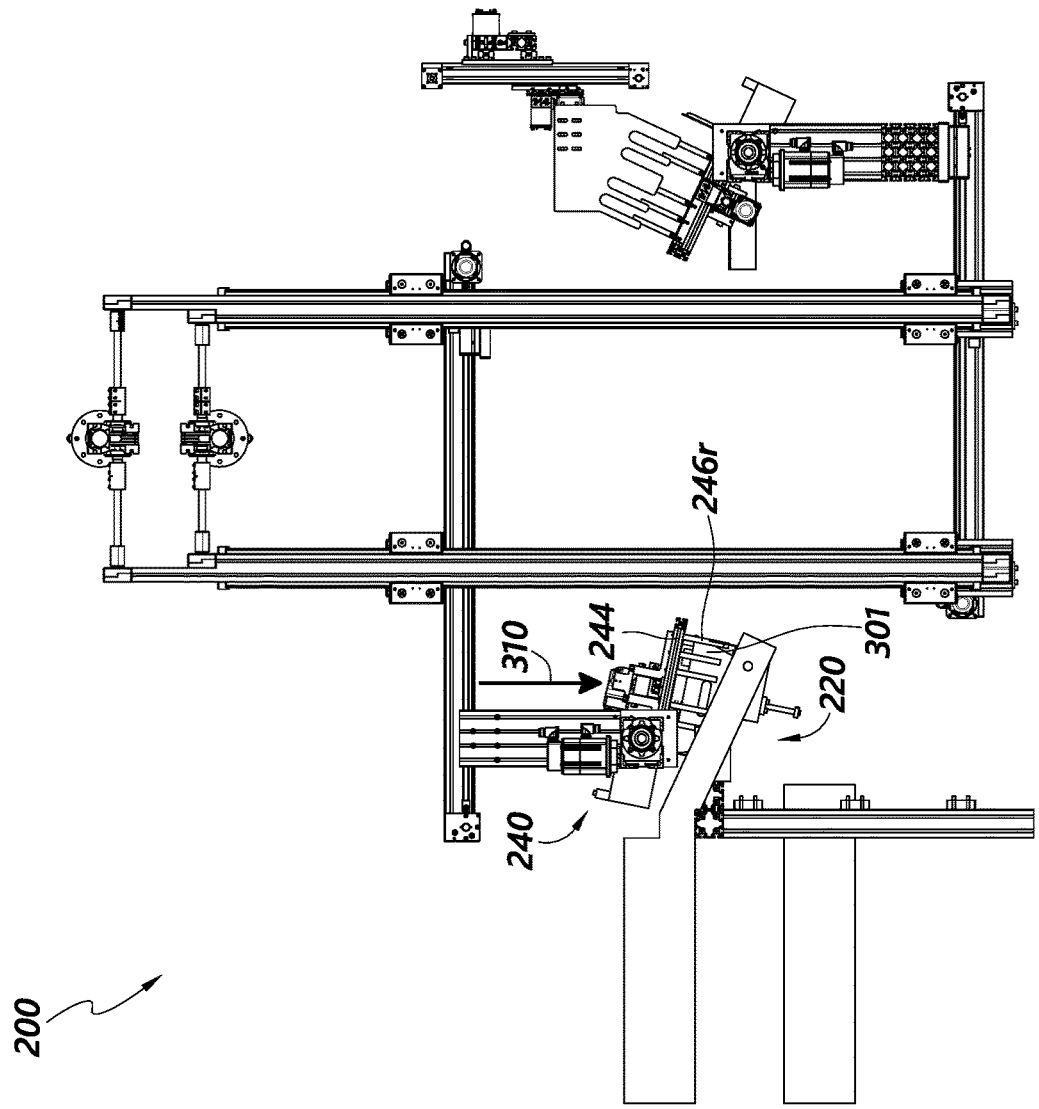

After the intermediate rotary assembly 240 is positioned above the tray 301, the process continues to the configuration shown in FIGS. 5A and 5B. As shown in FIGS. 5A and 5B, intermediate rotary assembly 240 has been lowered along direction 310 to a position slightly above the tray rotary assembly 220. The height of the intermediate rotary assembly 240 may be selected such that the platform 244 is disposed at a predetermined spacing relative to the platform 224 of the tray rotary assembly. For example, the spacing between the platforms 244 and 224 may be selected to accommodate the height of the items 302 (or a standard item height corresponding to a category of the items 302) and may include an additional margin such as 0.25 inches, 0.5 inches, 1 inch, 2 inches, etc., to accommodate the thickness of the floor of the tray 301 and/or any misaligned or oversized items 302. In the configuration of FIGS. 5A and 5B, the tray 301 is disposed between the left fingers 246*l* and the right fingers 246*r* of the intermediate rotary assembly 240 and the items 301 are contained within a space generally defined by the tray 301 and the platform 244 of the intermediate rotary assembly 240.

Figure 6A:
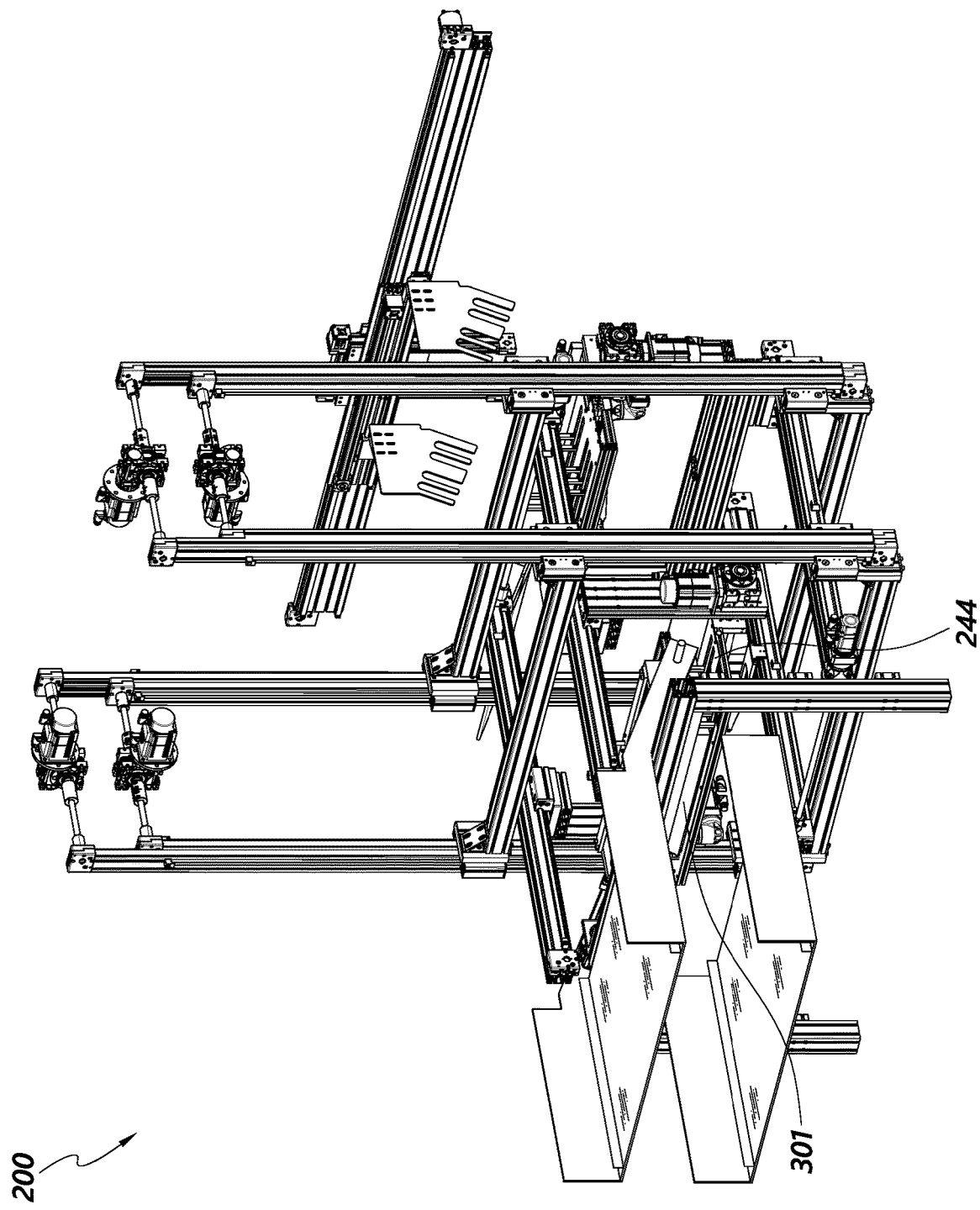

After the intermediate rotary assembly 240 is lowered, the process continues to the configuration shown in FIGS. 6A and 6B. As shown in FIGS. 6A and 6B, the items 302 have been rotationally transferred to the intermediate rotary assembly. Specifically, the tray rotary assembly 220 has been rotated outward 312 to a transfer position (e.g., position 225 as shown in FIG. 2C) such that the tray 301 is upside down. As the tray rotary assembly 220 rotates, the intermediate rotary assembly moves with a combination of horizontal motion 314, downward vertical motion 316, and corresponding rotational motion 318 to retain substantially the same parallel spacing between the platform 224 of the tray rotary assembly 220 and the platform 244 of the intermediate rotary assembly. By retaining substantially the same parallel spacing between platforms 224 and 244, the items 302 are retained within the tray 301 by the platform 244 such that items do not fall out of the tray content transfer system 200. In the configuration of FIGS. 6A and 6B, the items 302 rest on the platform 244 of the intermediate tray assembly 240.

Figure 7A:
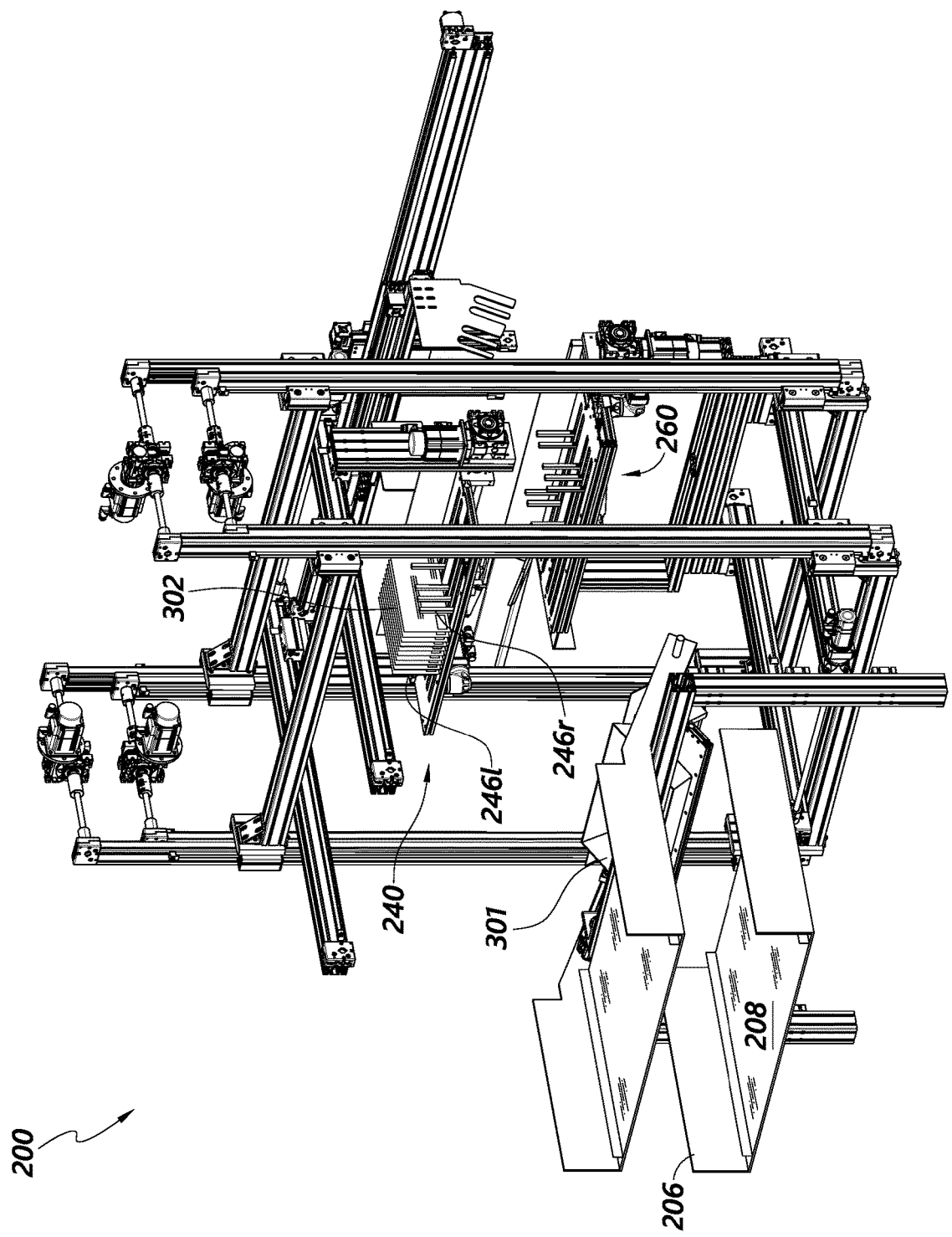
FIGS. 7A and 7B are perspective and side elevation views, respectively, of a fifth state of the tray content transfer system of FIG. 3 during the example tray content transfer process of FIGS. 3-6B.
Figure 7B:
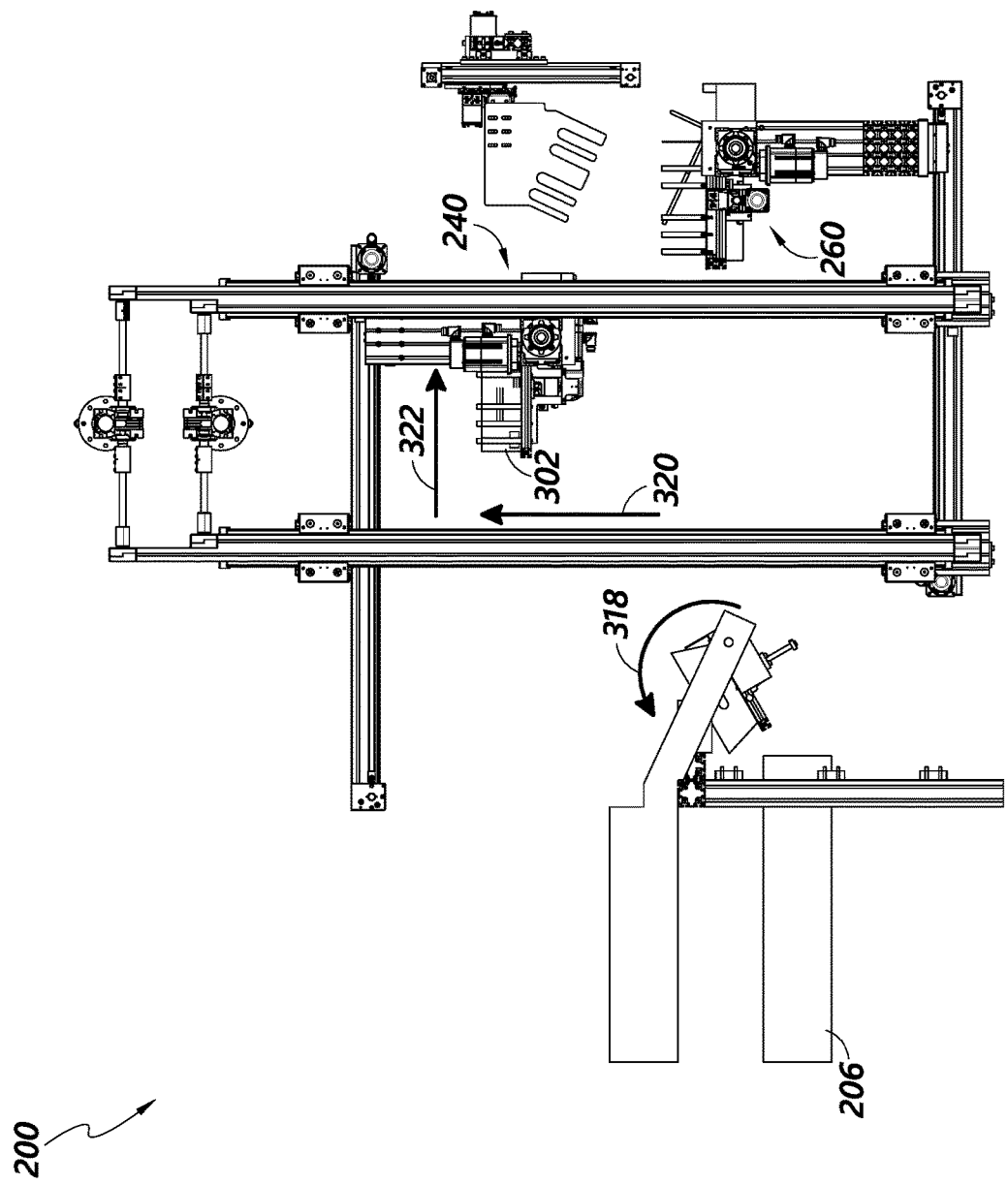

After the items 302 have been rotationally transferred to the intermediate rotary assembly 240 as shown in FIGS. 6A and 6B, the process continues to the configuration shown in FIGS. 7A and 7B. As shown in FIGS. 7A and 7B, the tray rotary assembly 220 has rotated along rotational direction 318 away from the intermediate rotary assembly 240, and the intermediate rotary assembly 240 has moved to a position relatively nearer the output rotary assembly 260. For example, the intermediate rotary assembly 240 may move with a combination of vertical movement 320 and horizontal movement 322. In some embodiments, the tray rotary assembly 220 rotates along direction 322 before the intermediate rotary assembly 240 moves, in order to release the items 302 from the tray 301 onto the intermediate rotary assembly 240.

After the tray 301 is moved away from the items 302, the fingers 246*l* and 246*r* of the intermediate rotary assembly 240 may be moved closer together in order to engage or squeeze the items 302. For example, if the items 302 are letters or flats, the closing of the fingers 246*l* and 246*r* may return the items 302 to a stacked configuration such that a first end of the stack is supported against left fingers 246*l* and a second end of the stack is supported against right fingers 246*r*. The spacing between the left fingers 246*l* and the right fingers 246*r* may be determined, for example, based on a predetermined spacing and/or based on feedback from one or more sensors such as force sensors disposed on left fingers 246*l* and/or on right fingers 246*r* (e.g., based on a threshold force detected at a sensor indicative of a desired compression force between the stack of items 302 and the fingers 246*l*, 246*r*). In some embodiments, monitoring circuitry of the intermediate rotary assembly 240 may transmit an indication of the distance between the left fingers 246*l* and the right fingers 246*r* to a controller of the tray content transfer system 200. The closing of the fingers 246*l*, 246*r* may occur before and/or during the movement of the intermediate rotary assembly 240 to the position shown in FIGS. 7A and 7B. In the position shown in FIGS. 7A and 7B, the intermediate rotary assembly 240 is ready to rotationally transfer the items 302 to the output rotary assembly 260.

Figure 8A:
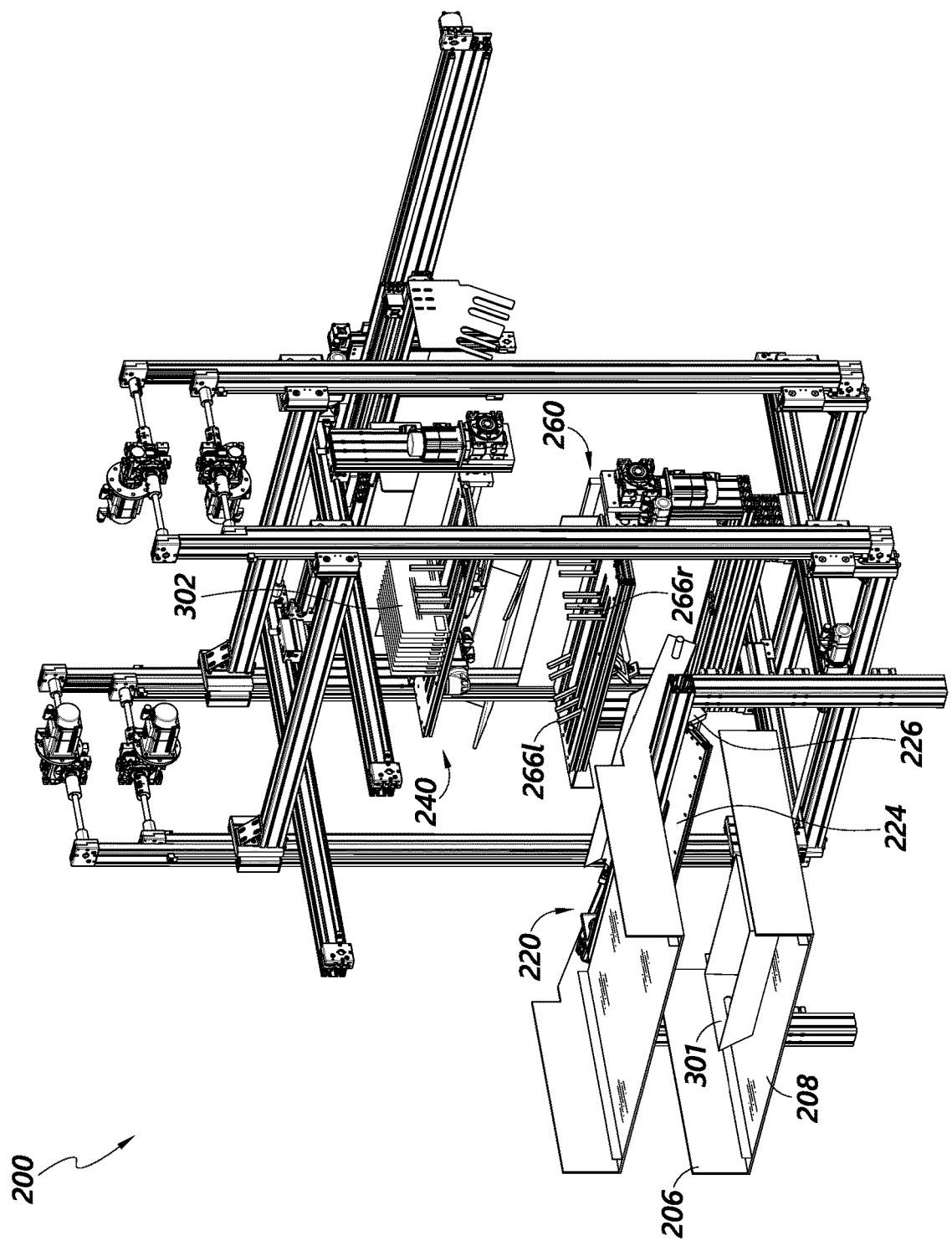
FIGS. 8A and 8B are perspective and side elevation views, respectively, of a sixth state of the tray content transfer system of FIG. 3 during the example tray content transfer process of FIGS. 3-7B.
Figure 8B:
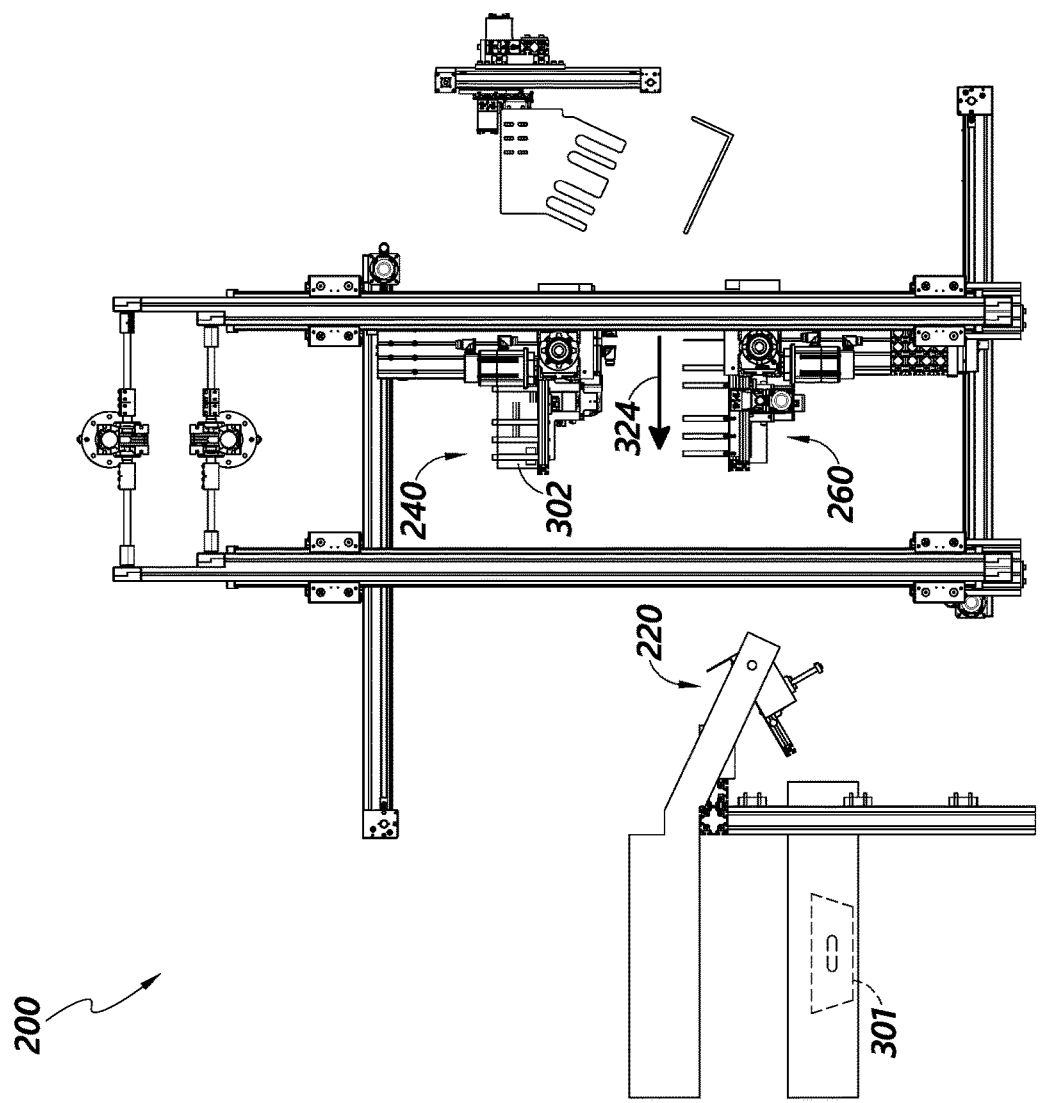

After the intermediate rotary assembly 240 moves clear of the tray rotary assembly, the process continues to the configuration shown in FIGS. 8A and 8B. As shown in FIGS. 8A and 8B, the output rotary assembly 260 begins moving horizontally and/or vertically (e.g., along direction 324) to meet with the intermediate rotary assembly 240 which contains the items 302. In some embodiments, if the intermediate rotary assembly 240 has transmitted a finger spacing corresponding to a width of the stack of items 302 to a processor of the tray content transfer system 200, the processor may transmit an indicator of the received finger spacing to control circuitry of the output rotary assembly 260. Based on the indicator received at the output rotary assembly 260, the control circuitry of the output rotary assembly 260 may cause the fingers 266*l*, 266*r* to move to a spacing corresponding to the spacing of the fingers 246*l*, 246*r* of the intermediate rotary assembly 240. For example, the fingers 266*l*, 266*r* may move to the same spacing as the fingers 246*l*, 246*r* (e.g., if the fingers 246*l*, 246*r* are sized and spaced so as to mesh with the fingers 266*l*, 266*r*) or a slightly larger spacing such that the items 302 and the fingers 246*l*, 246*r* can all fit within the space between left fingers 266*l* and right fingers 266*r*.

Additionally, as shown in FIGS. 8A and 8B, the tray rotary assembly 220 has rotated along direction 318 (see FIGS. 7A and 7B) to a position in which the platform 224 is sloped downward toward the tray output 206. The tray retainer 226 may release the tray 301 (e.g., by discontinuing a suction force against the bottom of the tray or releasing one or more mechanical interlocks) such that the tray 301 slides off the platform 224 and onto the tray output 206. The output conveyor 208 may carry the empty tray 301 away from the tray content transfer system 200 to a collection area, such as the empty source tray collection 130 of FIG. 1. Although the figures and description depict the empty tray 301 being removed at this point in the process, the tray removal can occur at any time after the tray contents have been transferred to the platform 224.

Figure 9A:
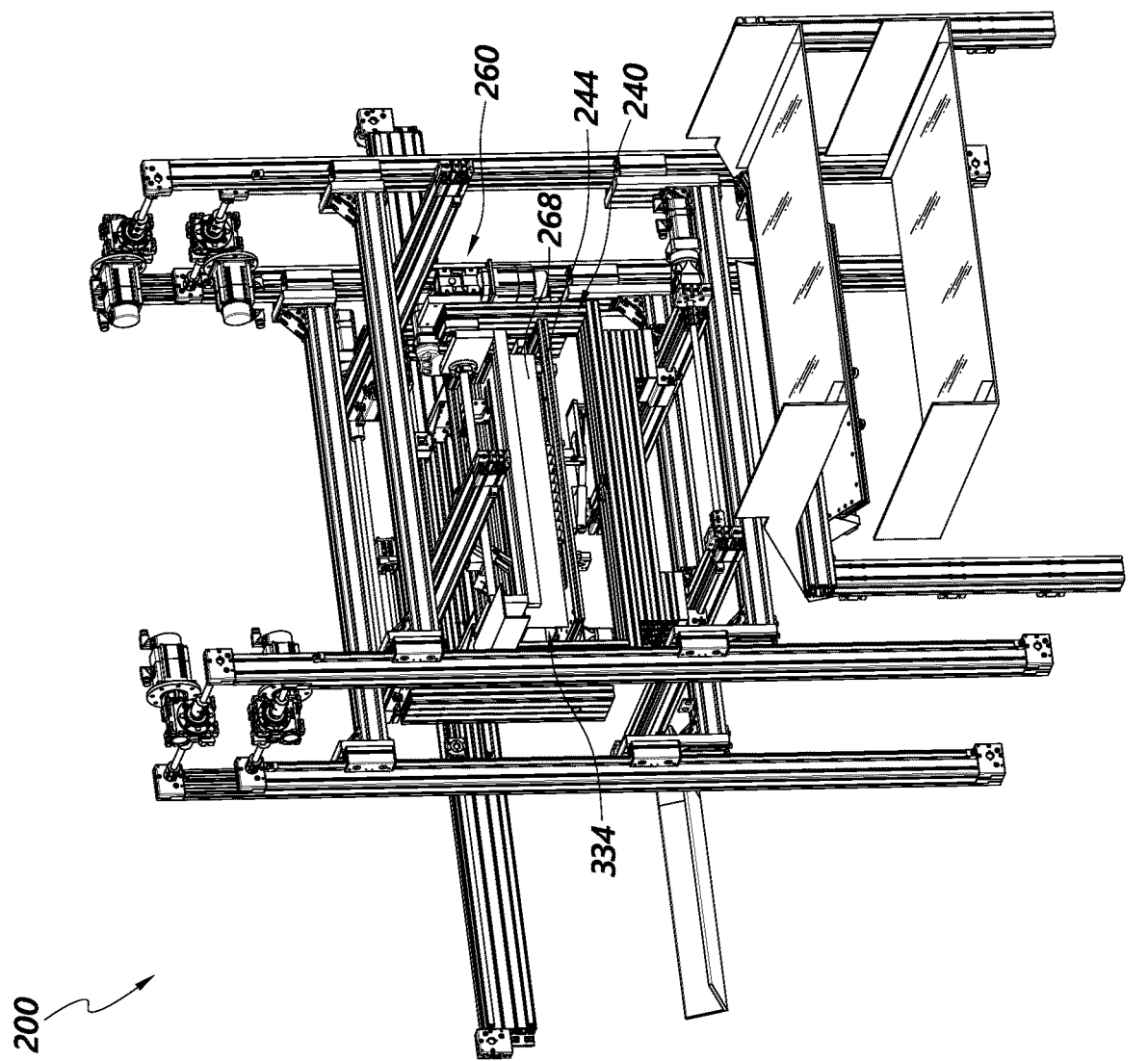
FIGS. 9A and 9B are perspective and side elevation views, respectively, of a seventh state of the tray content transfer system of FIG. 3 during the example tray content transfer process of FIGS. 3-8B.
Figure 9B:
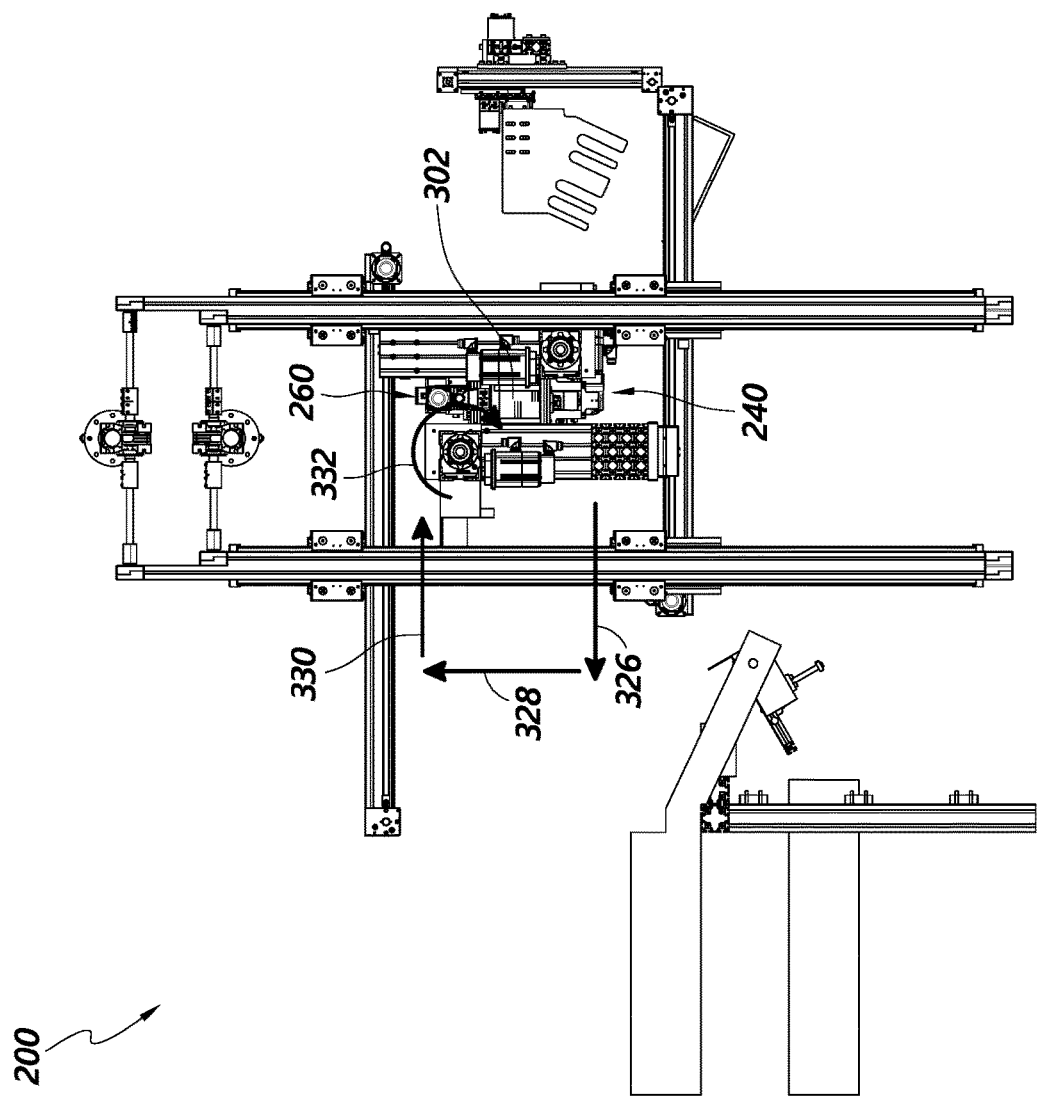

With reference now to FIGS. 9A and 9B, the output rotary assembly 260 continues to move with a combination of lateral translation 326, vertical translation 328, lateral translation 330 opposite lateral translation 326, and rotational motion 332 so as to maneuver around the intermediate rotary assembly 240 to a position above the platform 244. In the configuration illustrated in FIGS. 9A and 9B, the platform 264 of the output rotary assembly 260 is above and parallel to the platform 244 of the intermediate rotary assembly 240, such that the items 302 are disposed within a space 334 between the platforms 244 and 264. The space 334 is further bounded by the item support guide 248 of the intermediate rotary assembly 240, the item support guide 268 of the output rotary assembly 260, the left and right fingers 2461, 246r of the intermediate rotary assembly 240, and the left and right fingers 2661, 266r of the output rotary assembly 260. In the configuration of FIGS. 9A and 9B, the items 302 are ready to be rotationally transferred from the intermediate rotary assembly 240 to the output rotary assembly 260.

Figure 10A:
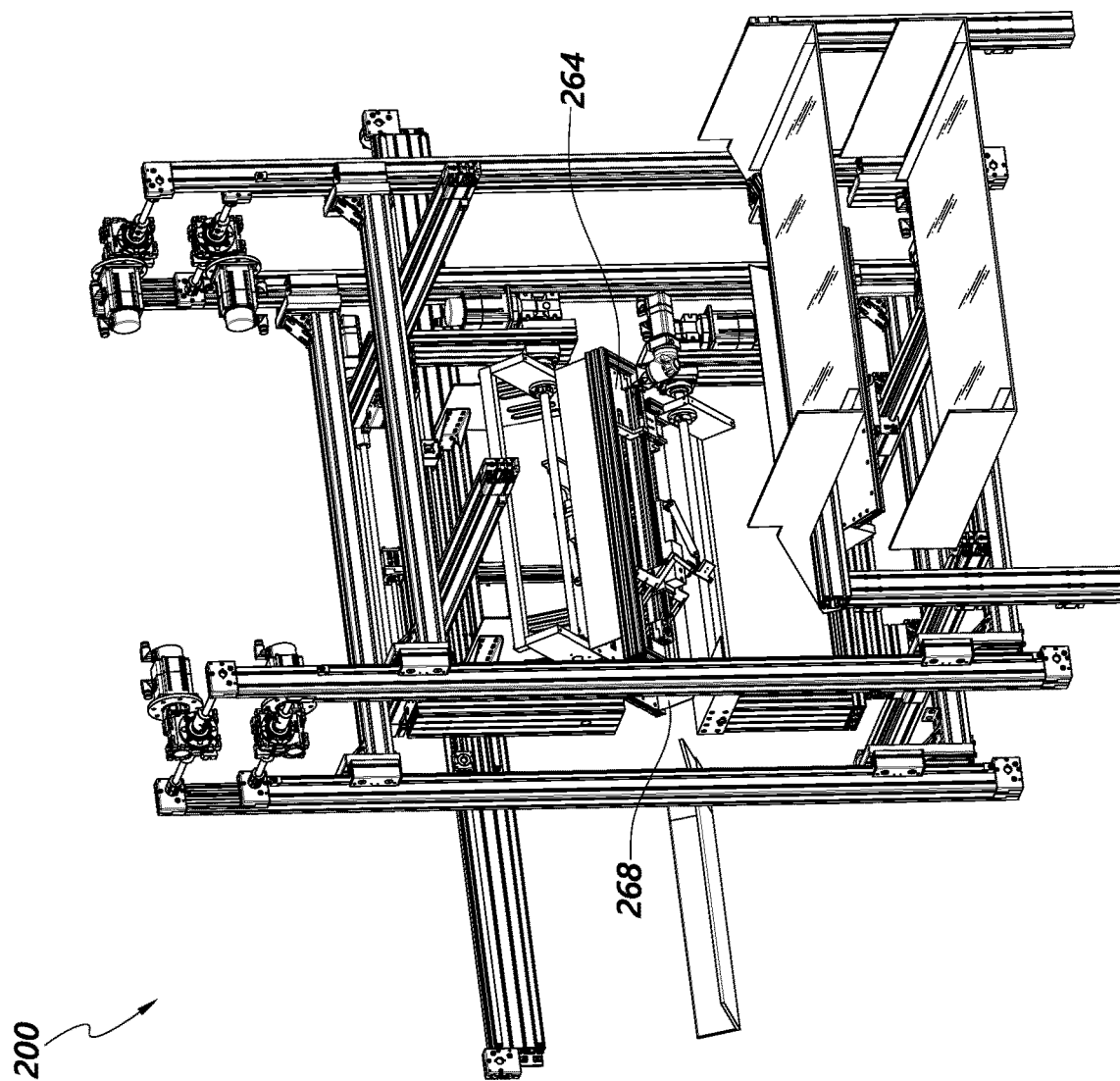
FIGS. 10A and 10B are perspective and side elevation views, respectively, of an eighth state of the tray content transfer system of FIG. 3 during the example tray content transfer process of FIGS. 3-9B.
Figure 10B:
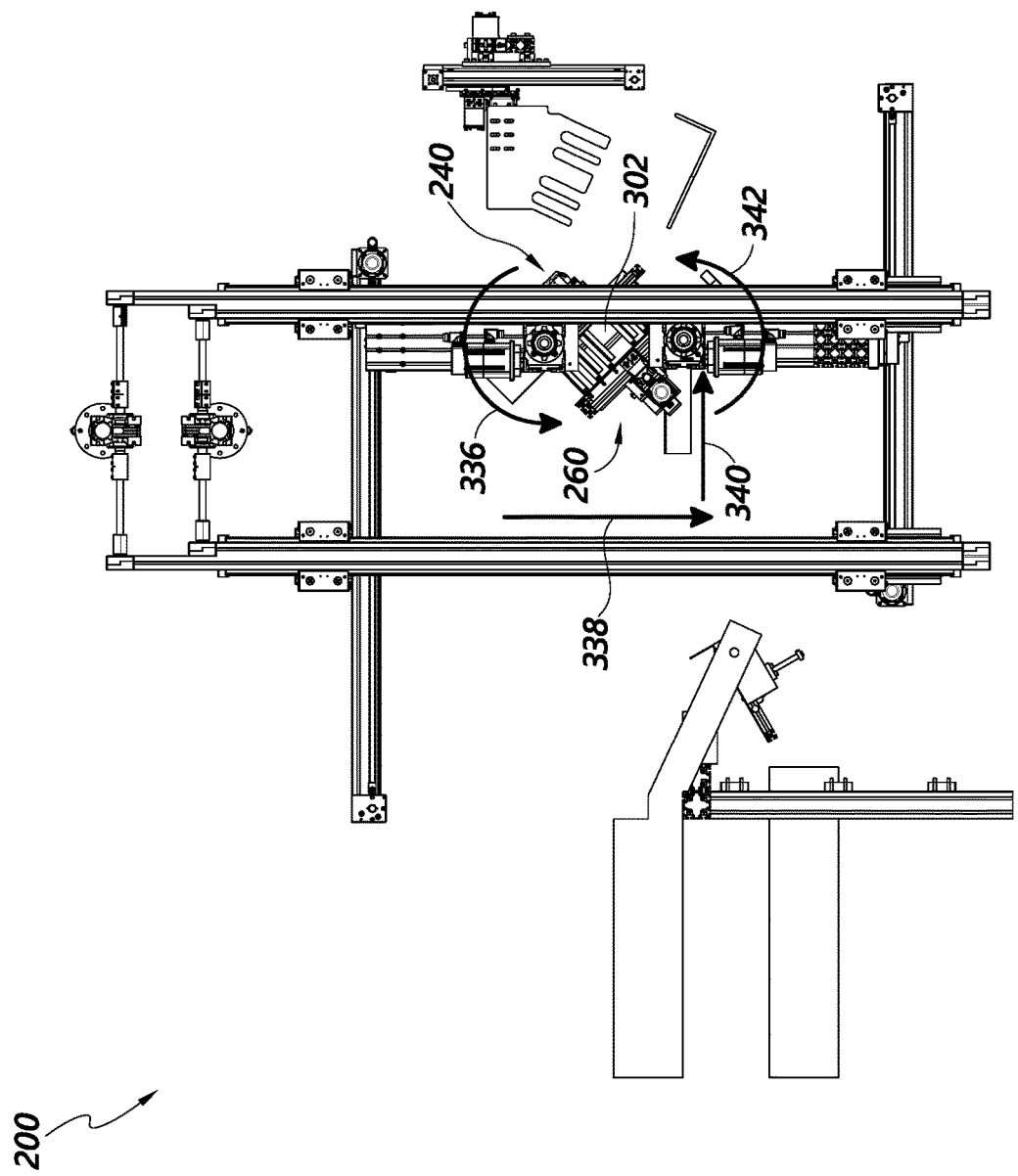

After the output rotary assembly 260 is placed above the intermediate rotary assembly 240, the process continues to the configuration shown in FIGS. 10A and 10B. As shown in FIGS. 10A and 10B, the intermediate rotary assembly 240 and the output rotary assembly 260 move simultaneously to begin the rotational transfer of the items 302 to the output rotary assembly 260. In this example process, the axis of rotation of the intermediate rotary assembly 240 remains in place as the intermediate rotary assembly 240 rotates along direction 336, while the output rotary assembly 260 moves with a combination of vertical translation 338, horizontal translation 340, and rotational motion 342, such that the parallel spacing of the platforms 244 and 264 is retained as the intermediate rotary assembly 240 rotates. When the intermediate rotary assembly 240 and the output rotary assembly 260 reach the positions shown in FIGS. 10A and 10B, the items 302, which were previously resting on the platform 244 of the intermediate rotary assembly 240, are now resting on the platform 264 and the item support guide 268 of the output rotary assembly 260. At this stage, the items 302 have been rotationally transferred to the output rotary assembly 260.

Figure 11A:
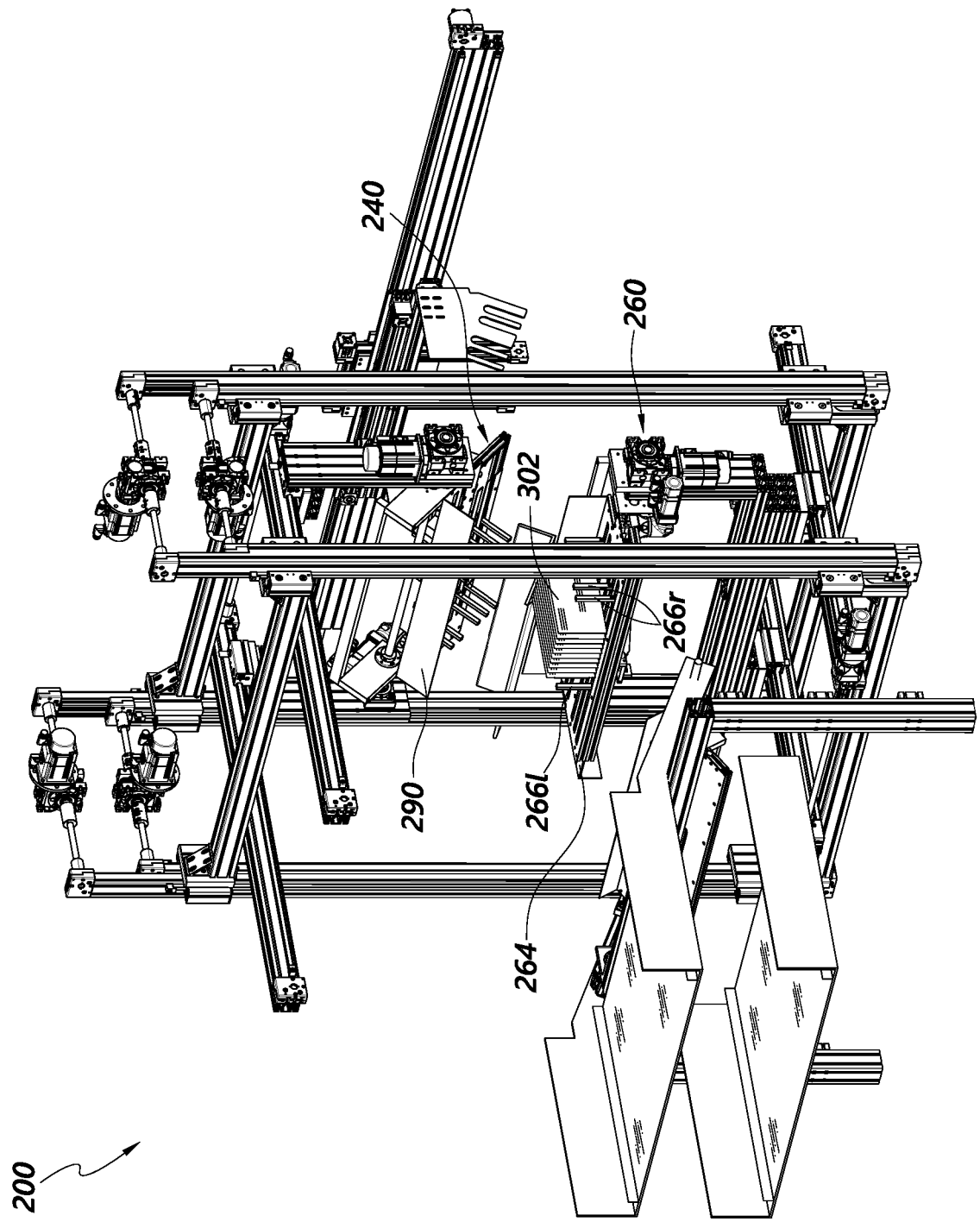
FIGS. 11A and 11B are perspective and side elevation views, respectively, of a ninth state of the tray content transfer system of FIG. 3 during the example tray content transfer process of FIGS. 3-10B.
Figure 11B:
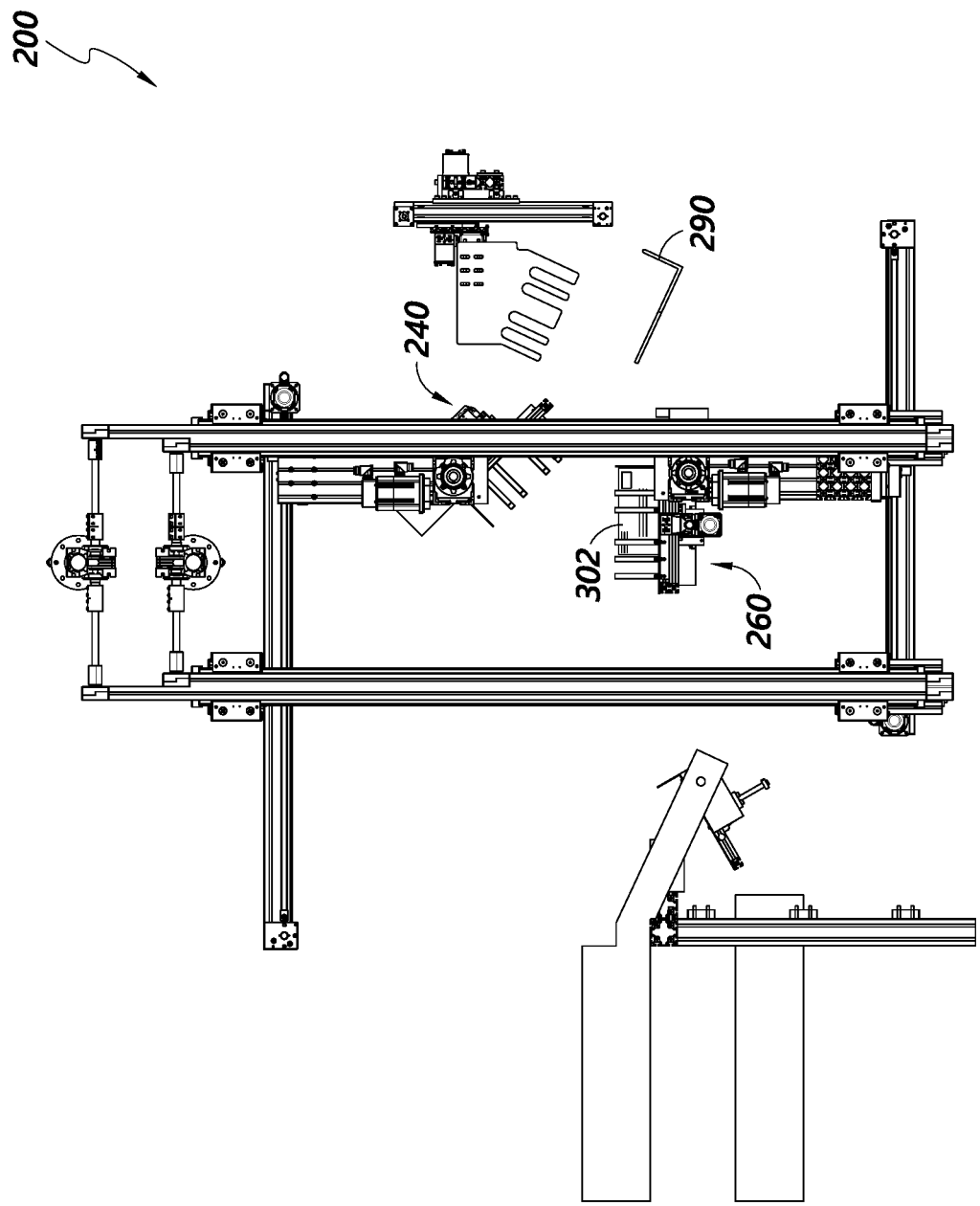
Figure 12:
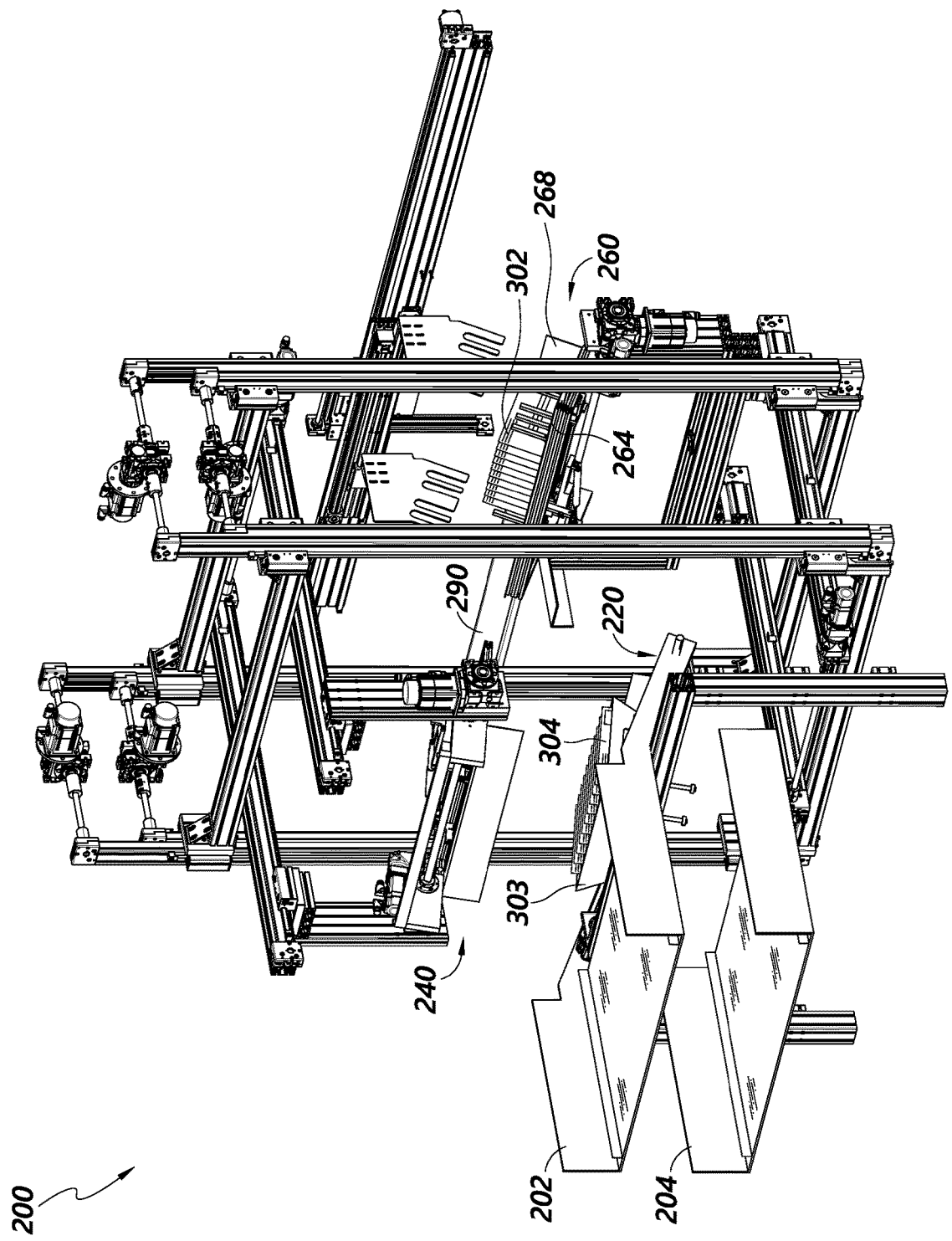
FIG. 12 is a perspective view of a tenth state of the tray content transfer system of FIG. 3 during the example tray content transfer process of FIGS. 3-11B.

Continuing to FIGS. 11A and 11B, the intermediate rotary assembly 240 begins to move up and away from the output rotary assembly 260, such that the output rotary assembly 260 is free to move the items 302 to their output location, such as shelf 290. The items 302, having been rotationally transferred from the intermediate rotary assembly 240 to the output rotary assembly 260, rest on the platform 264 of the output rotary assembly After the intermediate rotary assembly 240 and the output rotary assembly 260 have moved apart, the process continues to FIG. 12. As shown in FIG. 12, the output rotary assembly 260 has moved to an output position where the platform 264 and the item support guide 268 are substantially aligned with the shelf 290 or other output location where the items 302 will be transferred.

Additionally, as the intermediate rotary assembly 240 has moved away from the output rotary assembly 260 and is no longer involved in transferring the items 301, the tray content transfer system 200 may begin a second item transfer process while it is still completing the first item transfer process. Thus, as the output rotary assembly 260 aligns with the shelf 290, the tray rotary assembly 220 may receive a second tray 303 containing items 304 to be transferred by the same process. The tray 304 is received at the tray rotary assembly 220 from the tray input 202, for example, being moved onto the tray rotary assembly by the input conveyor 204.

Figure 13:
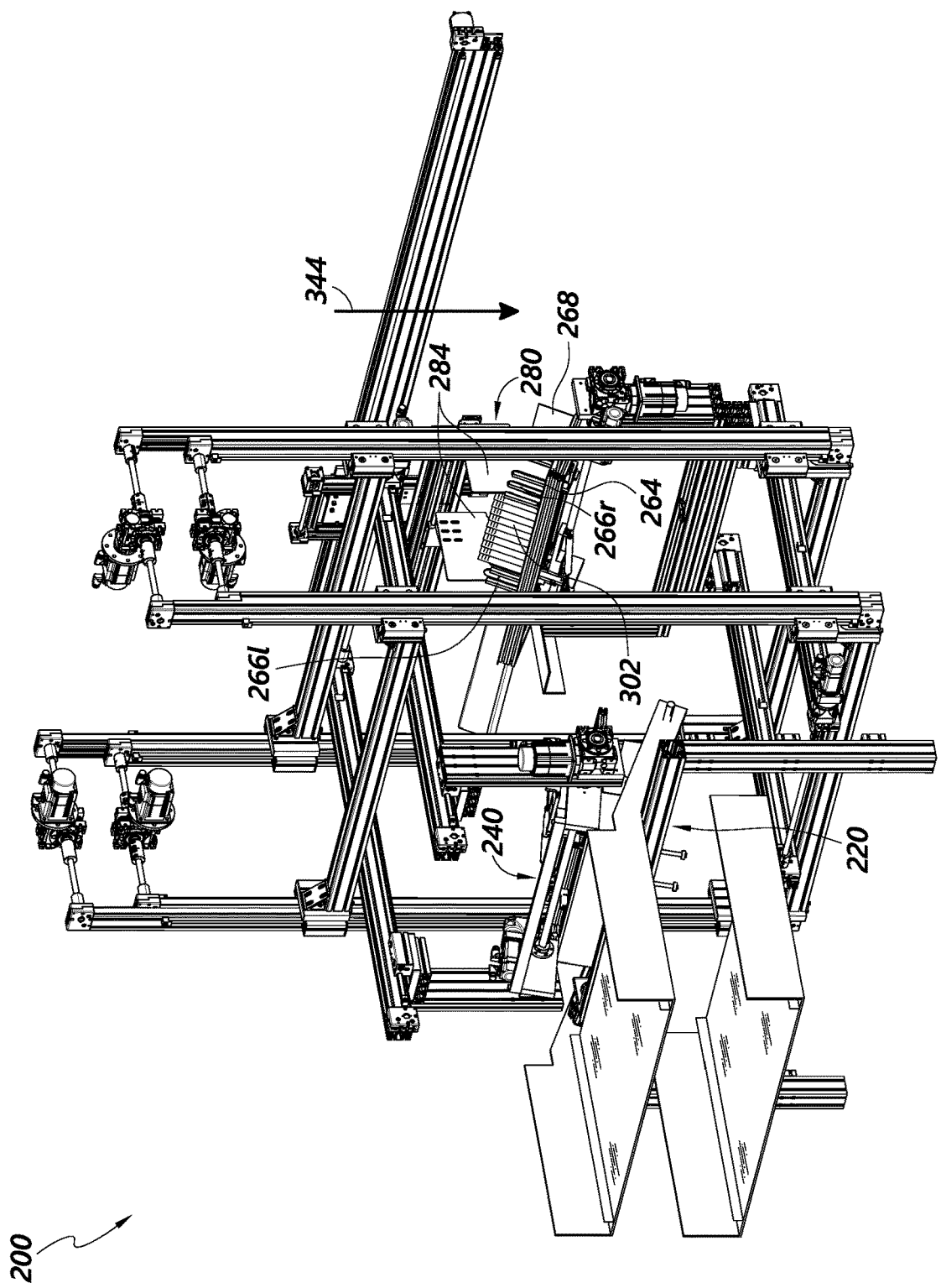
FIG. 13 is a perspective view of an eleventh state of the tray content transfer system of FIG. 3 during the example tray content transfer process of FIGS. 3-12.

After the output rotary assembly 260 is aligned with the shelf 290, the process continues to the configuration shown in FIG. 13 as the paddle assembly 280 moves downward along direction 344 such that the paddles 284 and/or the paddle fingers 286 surround the items 302 as the items 302 rest on the platform 264 and the item support guide 268 of the output rotary assembly 260. In some embodiments, the paddles 284 are moved to be spaced slightly farther apart than the outsides of the fingers 2661, 266r of the output rotary assembly 260, such that the fingers 2661, 266r do not impede the downward motion of the paddles 284. At the same time, the tray content transfer system 200 may continue the process of transferring the items 304 from the second tray 303 by lowering the intermediate rotary assembly 240 to a position above and parallel to the tray rotary assembly 220, e.g., as described above with reference to FIGS. 5A and 5B.

Figure 14:
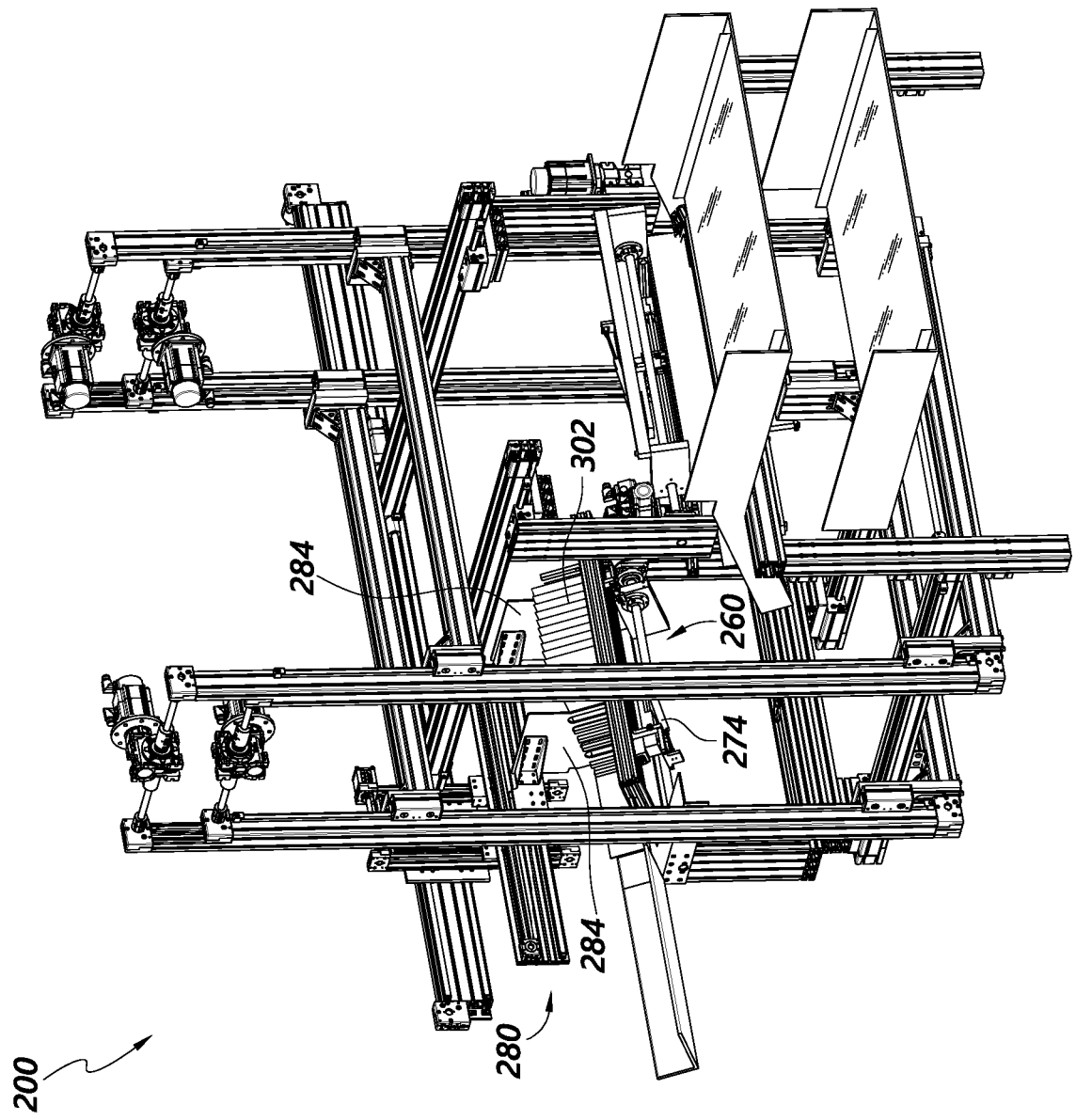
FIG. 14 is a perspective view of a twelfth state of the tray content transfer system of FIG. 3 during the example tray content transfer process of FIGS. 3-13.

After the paddle assembly 280 moves downward such that the paddles 284 and/or paddle fingers 286 surround the items 302, the process continues to the configuration shown in FIG. 14. As shown in FIG. 14, the output finger motor 274 tilts the left fingers 2661 (not visible in FIG. 14) downward to a lowered position such that the left fingers 2661 do not extend above the platform 264 of the output rotary assembly 260. This lowered position of the left fingers 2661 allows the items 302 to slide laterally off of the output rotary assembly 260. The items 302 remain in place due to the presence of the paddles 284.

Figure 15A:
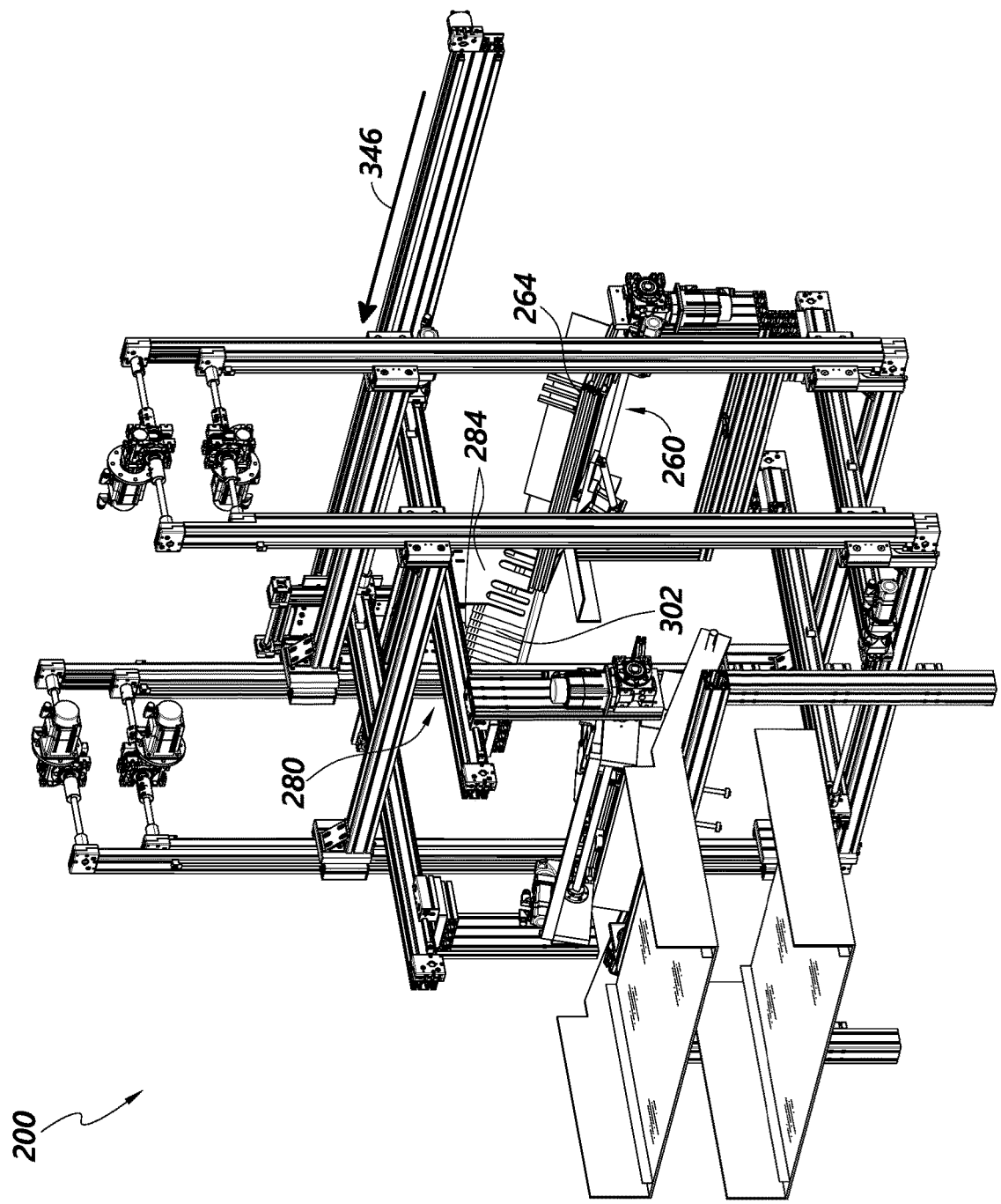
FIGS. 15A and 15B are perspective views of a thirteenth state of the tray content transfer system of FIG. 3 during the example tray content transfer process of FIGS. 3-14.
Figure 15B:
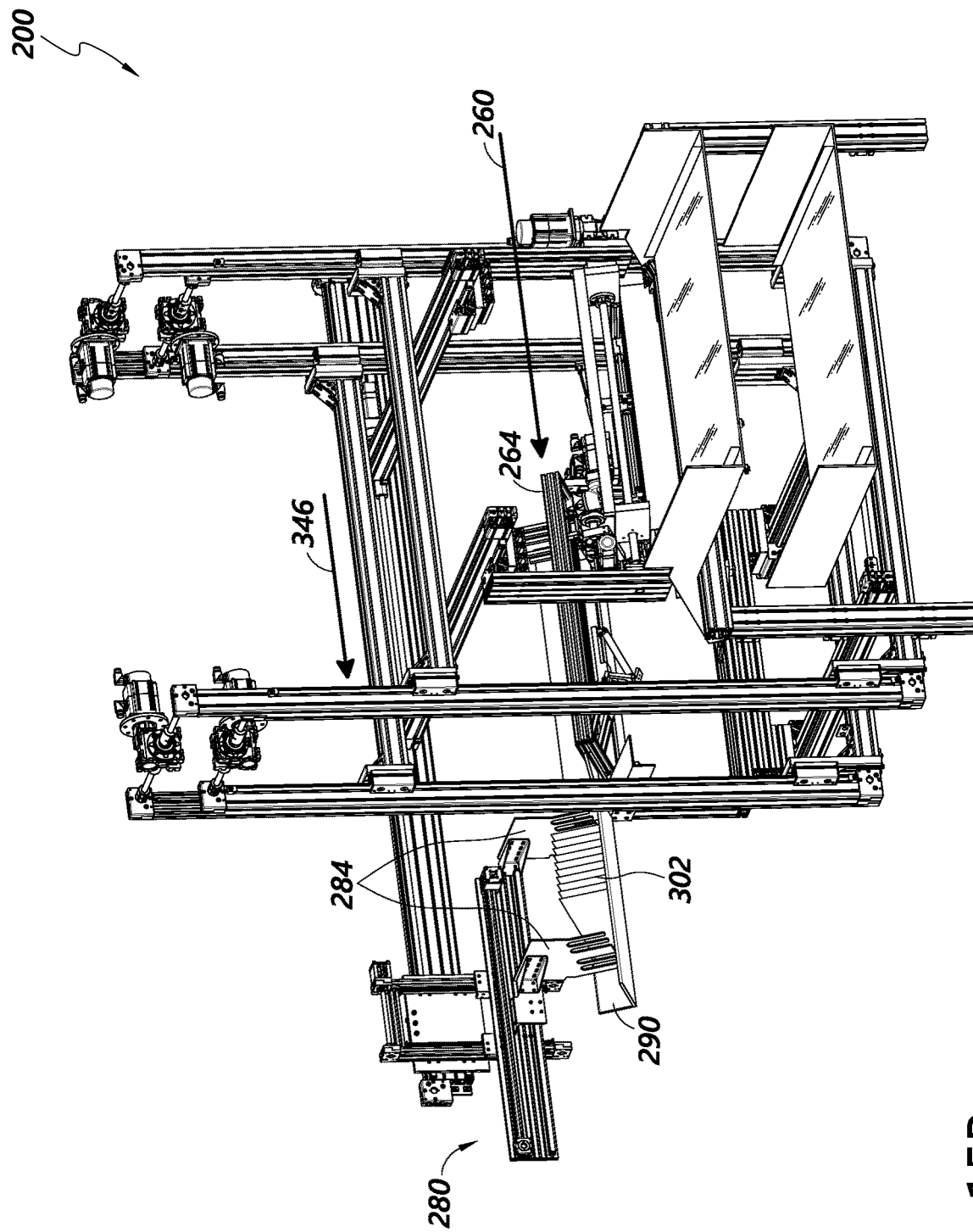
Figure 16:
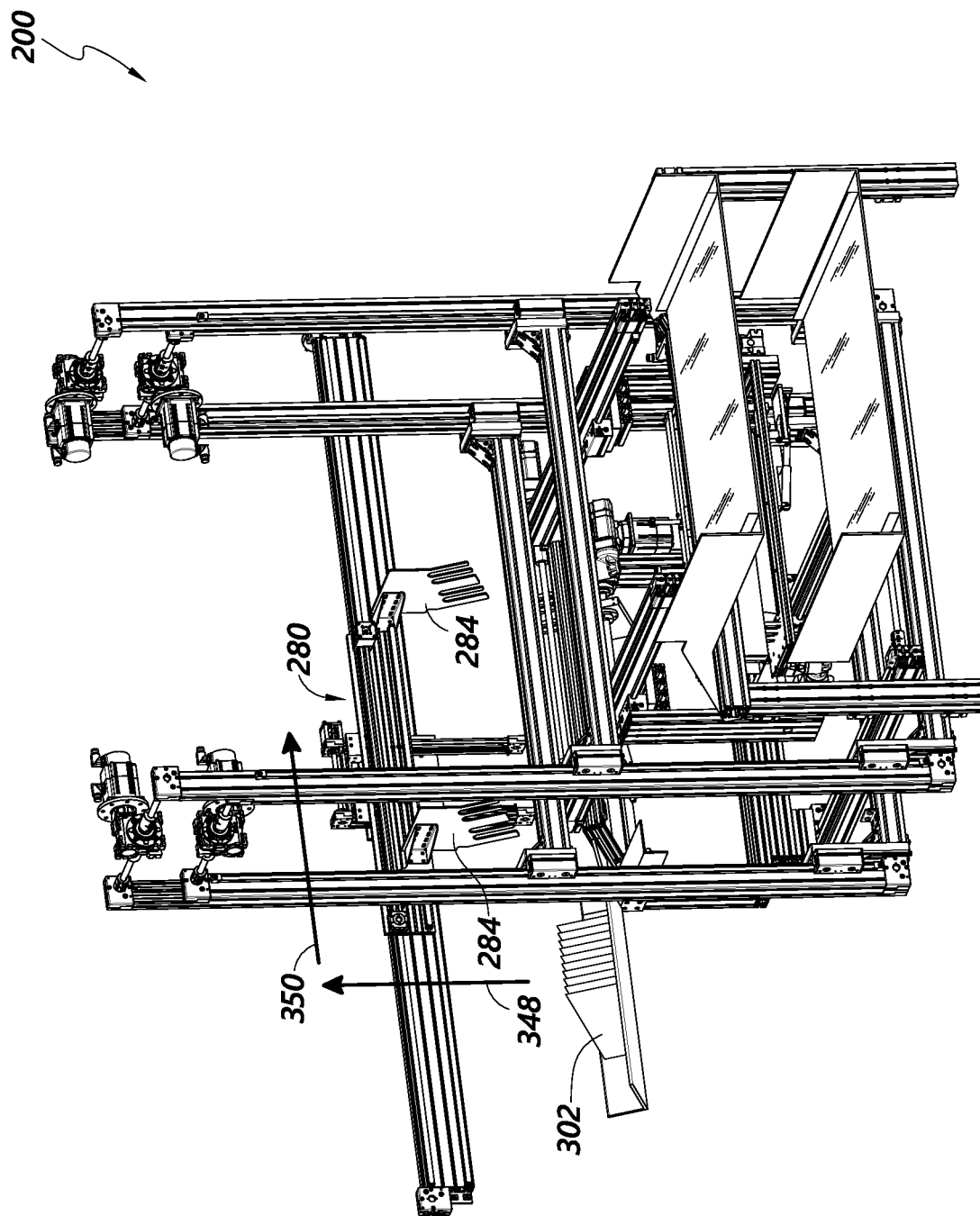
FIG. 16 is a perspective view of a fourteenth state of the tray content transfer system of FIG. 3 during the example tray content transfer process of FIGS. 3-15B.

After the left fingers 2661 are tilted down to a lowered position, the paddle assembly 280 moves laterally along direction 346 to the position shown in FIGS. 15A and 15B. As the paddle assembly 280 moves along direction 346, the paddles 284 and paddle fingers 286 retain the items 302 therebetween, such that the items 302 slide along the platform 264 of the output rotary assembly 260 and onto the shelf 290. To complete the tray content transfer process, the paddle assembly 280 can return to the configuration shown in FIG. 16 by moving upward along direction 348 and laterally along direction 350 to return to a position above the output rotary assembly 260. The items 302 on the shelf 290 may be transferred to other item moving components of an adjacent processing apparatus (e.g., processing apparatus 120 of FIG. 1) configured to receive the items 302 from the shelf 290. For example, one or more paddles associated with the processing apparatus 120 may move into position around the items 302 before or after the paddle assembly 280 moves upward to release the items 302, and may continue moving the items 302 along the shelf 290 to the processing apparatus 120. At this stage, the tray content transfer process is complete for the items 302 and can be repeated indefinitely as additional trays 304 etc. arrive with contents to be transferred.

Figure 17:
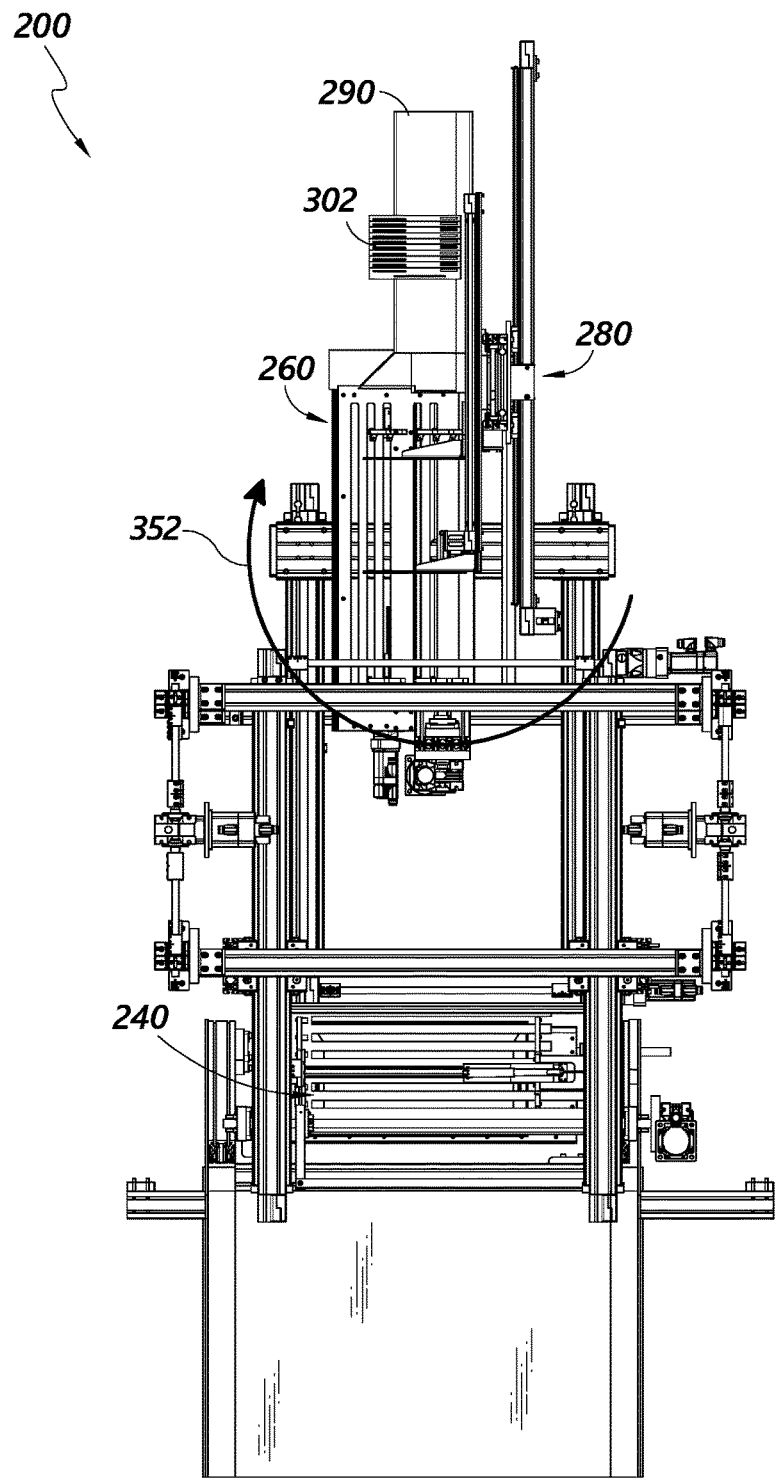
FIG. 17 is a perspective view of an example embodiment of a tray content transfer system including an output rotary assembly configured to rotate about a vertical axis.

As discussed above with reference to FIG. 2F, in some embodiments the output rotary assembly may be further configured for rotation about a vertical axis. FIG. 17 illustrates such a configuration of a tray content transfer system 200. As shown in FIG. 17, a shelf 290 may be located at an angular orientation, relative to the tray content transfer system 200, different from that shown in FIGS. 3-16. In this configuration, after the items 302 have been rotationally transferred from the intermediate rotary assembly 240 to the output rotary assembly 260 and the intermediate rotary assembly 240 has separated from the output rotary assembly (e.g., at FIGS. 11A and 11B), the output rotary assembly 260 may then rotate using rotational motion 352 about vertical axis 275 to align with the shelf 290. The output rotary assembly 260 and paddle assembly 280 may then transfer the items 302 onto the shelf 290 substantially as described with reference to FIGS. 12-16 above.

Figure 18:
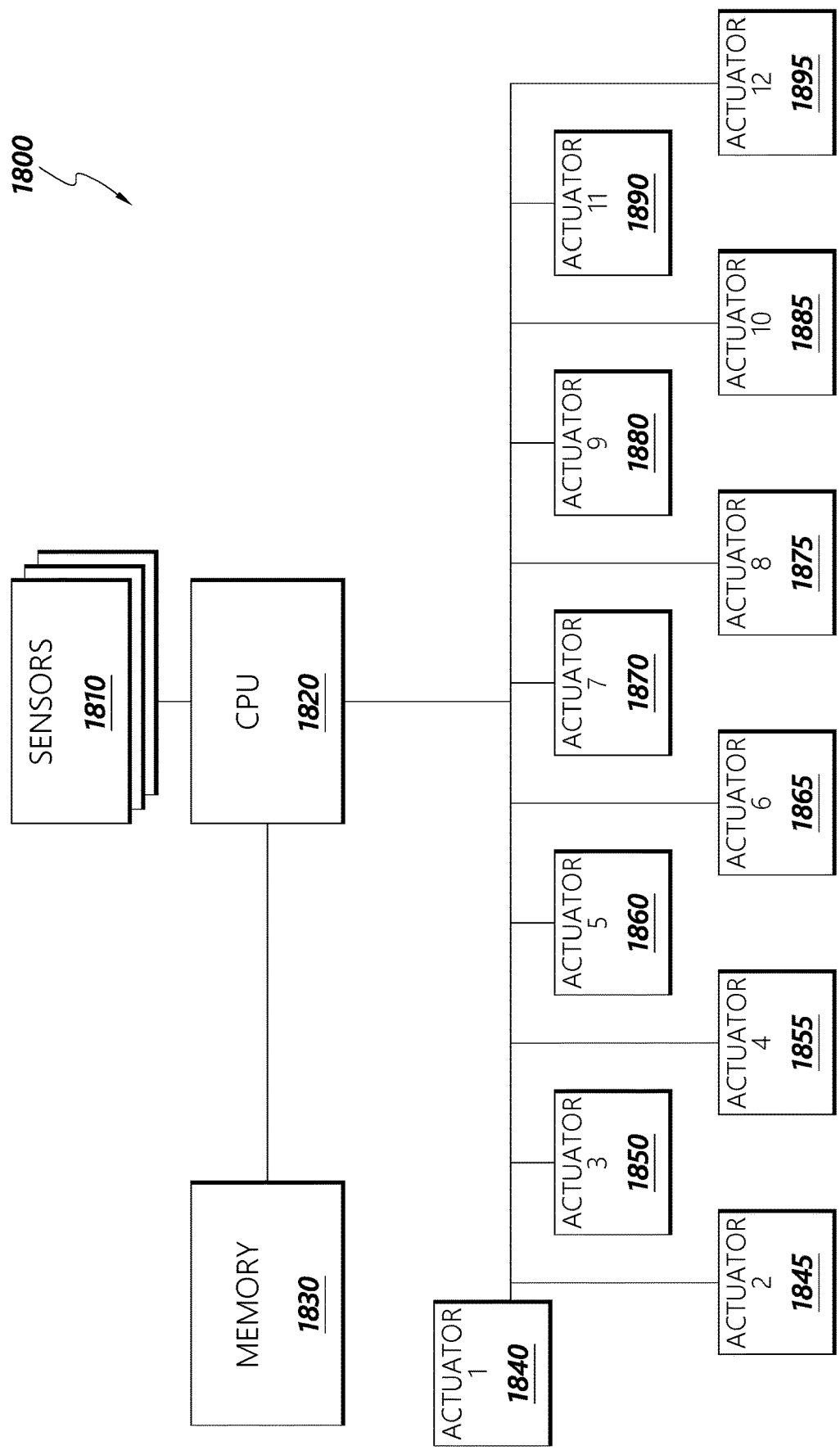
FIG. 18 is a block diagram of a tray content transfer system.

FIG. 18 is a block diagram of a tray content transfer system 1800 in accordance with an example embodiment. The system 1800 includes a sensor 1810 in communication with a CPU 1820. The CPU 1820 is further in communication with a memory 1830 and actuators including actuator 1840, actuator 1845, actuator 1850, actuator 1855, actuator

1860, actuator 1865, actuator 1870, actuator 1875, actuator 1880, actuator 1885, actuator 1890, and actuator 1895. Although the system 1800 is depicted as having 12 actuators, the number of actuators in various embodiments can be greater or smaller than 12, for example, based on the number of parts to be moved in any particular embodiment of the system 1800.

The system 1800 includes one or more sensors 1810 configured to determine a status of one or more components of the system 1800. For example, the sensors 1810 can include a sensor configured to detect the presence of a tray before initiating a transfer process (e.g., a light gate or photoelectric sensor disposed to be triggered when a tray passes from the tray input 202 onto the tray rotary assembly 220, or a pressure sensor configured to detect a low pressure when the bottom surface of a tray is present on the suction-type tray retainer 226). In another example, the sensors 1810 can include a force sensor disposed on left fingers 246l and/or right fingers 246r of the intermediate rotary assembly and configured to transmit a signal when a threshold force is detected, indicating that the left and right fingers 246l, 246r have surrounded and suitably compressed the stack of items 302. The CPU 1820 may then cause an indicator of the spacing between fingers 246l and 246r to be stored in the memory 1830 to subsequently set the spacing of the fingers 266l and 266r of the output rotary assembly 260 and the spacing of the paddles 284 of the paddle assembly 280 in order to facilitate a smooth transfer of items from the intermediate rotary assembly 240 to the output rotary assembly 260 and from the output rotary assembly 260 to the paddle assembly 280. In various implementations, the sensors 1810 can include one or more proximity sensors, profile sensors, pressure sensors, force sensors, scales, cameras, optical pattern recognition devices such as barcode scanners, light gates, or the like. In some embodiments, the sensors 1810 can include a manually activated device, such as a button, configured to produce a signal indicating that a tray has been loaded into the system 1800.

The CPU 1820 is configured to control and receive input from the sensors 1810, the memory 1830, and the actuators 1840, 1845, 1850, 1855, 1860, 1865, 1870, 1875, 1880, 1885, 1890, and 1895. The memory 1830 can store data received from the CPU 1820 and send data stored therein to the CPU 1820. Examples of information that may be received and stored in the memory 1830 include, for example, information received at the CPU 1820 from the sensors 1810, information received at the CPU from the actuators 1840, 1845, 1850, 1855, 1860, 1865, 1870, 1875, 1880, 1885, 1890, 1895, and one or more computer-executable instructions that, when executed by the CPU 1820, cause the CPU to selectively activate and/or deactivate the actuators 1840, 1845, 1850, 1855, 1860, 1865, 1870, 1875, 1880, 1885, 1890, 1895 in a predetermined sequence to transfer items from a tray.

The actuators 1840, 1845, 1850, 1855, 1860, 1865, 1870, 1875, 1880, 1885, 1890, 1895 can be electronically controllable actuators each coupled to and configured to move one or more mechanical components of the system 1800. Each actuator 1841840, 1845, 1850, 1855, 1860, 1865, 1870, 1875, 1880, 1885, 1890, 1895 can include one or more electric motors, hydraulic cylinders, pneumatic actuators, screw jacks, servos, solenoids, or the like. In one example implementation of the tray content transfer system 200 depicted in FIGS. 2A-2F, the actuators may be arranged such that, for example, actuator 1840 corresponds to the tray rotary assembly motor 230, actuator 1845 corresponds to the intermediate rotary assembly vertical motors 250v, actuator 1850 corresponds to the intermediate rotary assembly horizontal motors 250h, actuator 1855 corresponds to the intermediate rotary assembly rotational motor 250r, actuator 1860 corresponds to the intermediate finger motor 254, actuator 1865 corresponds to the output rotary assembly vertical motors 270v, actuator 1870 corresponds to the output rotary assembly horizontal motors 270h, actuator 1875 corresponds to the output rotary assembly rotational motor 270r, actuator 1880 corresponds to the output finger motor 274, actuator 1885 corresponds to the paddle assembly horizontal motors 288h, actuator 1890 corresponds to the paddle assembly vertical motors 288v, and actuator 1895 corresponds to the paddle motor 288p.

Figure 19:
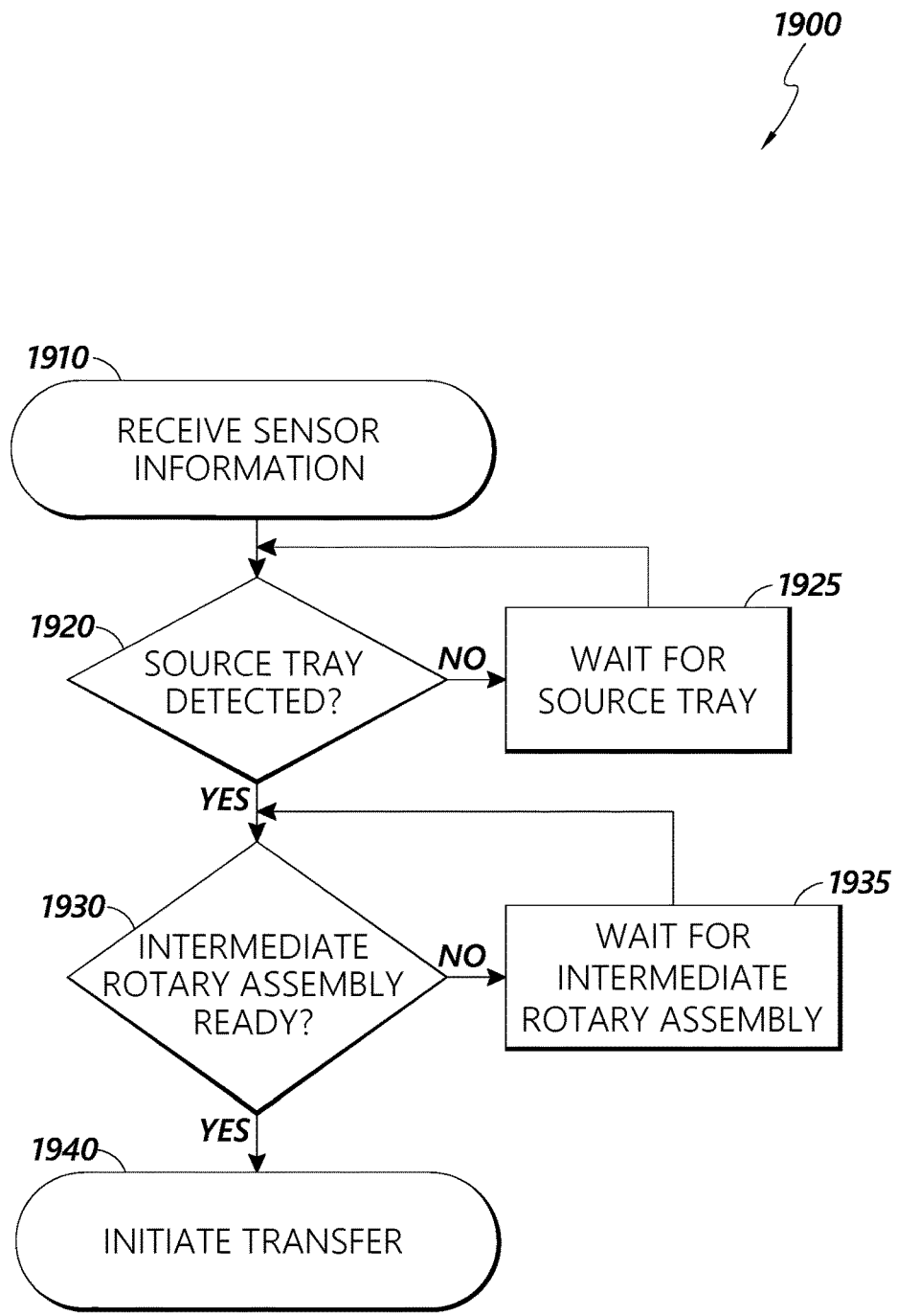
FIG. 19 is a flowchart illustrating an example method of initiating the transfer of items from a container.

FIG. 19 is a flowchart illustrating an example method 1900 of initiating the transfer of items from a container. The method 1900 can be performed by a computer system integrated within a system such as the tray content transfer systems 105, 200, 1800 depicted in FIGS. 1-18. Although the method 1900 is described with reference to the tray content transfer system 1800, it may equally be performed within any of the tray content transfer systems described herein.

The method 1900 begins with block 1910, where the system 1800 begins receiving information from the sensors 1810. The information can be an electrical signal indicating that a tray has or has not been detected within the system 1800. When the system 1800 has begun receiving information from the sensors 1810, the method 1900 continues to decision state 1920.

At decision state 1920, it is determined whether a source tray has been detected. For example, the CPU 1820 can analyze a signal received from one the sensors 1810 configured to detect the presence of a source tray within the system 1800 at a suitable location for transferring items from the source tray (e.g., a photoelectric sensor that detects trays passing from the tray input 202 to the tray rotary assembly 220 of the tray content transfer system 200, or a pressure sensor associated with the tray retainer 226). If it is determined that a source tray has not been detected, the method 1900 continues to block 1925, where the system 1800 waits for a source tray to be detected and returns to decision state 1920. If it is determined that a source tray has been detected, the method 1900 continues to decision state 1930.

At decision state 1930, it is determined whether the intermediate rotary assembly (e.g., intermediate rotary assembly 240 of the tray content transfer system 200) is ready. For example, the CPU 1820 can analyze a signal received from a sensor 1810 configured to detect the position of the intermediate rotary assembly and/or can be in communication with the actuator associated with the intermediate rotary assembly to determine if the intermediate rotary assembly is ready. If it is determined that the intermediate rotary assembly is not ready (e.g., the intermediate rotary assembly is still in the process of rotationally transferring a stack of items to output rotary assembly and has not yet disengaged from the output rotary assembly, such as shown in FIGS. 10A and 10B), the method 1900 continues to block 1935, where the system 1800 waits for the intermediate rotary assembly to be ready and returns to decision state 1930. If it is determined that the intermediate rotary assembly is ready (e.g., having finished rotationally transferring the preceding stack of items to the output rotary assembly), the method 1900 continues to block 1940. At block 1940, the method 1900 terminates by initiating the transfer of items from the tray.

Figure 20:
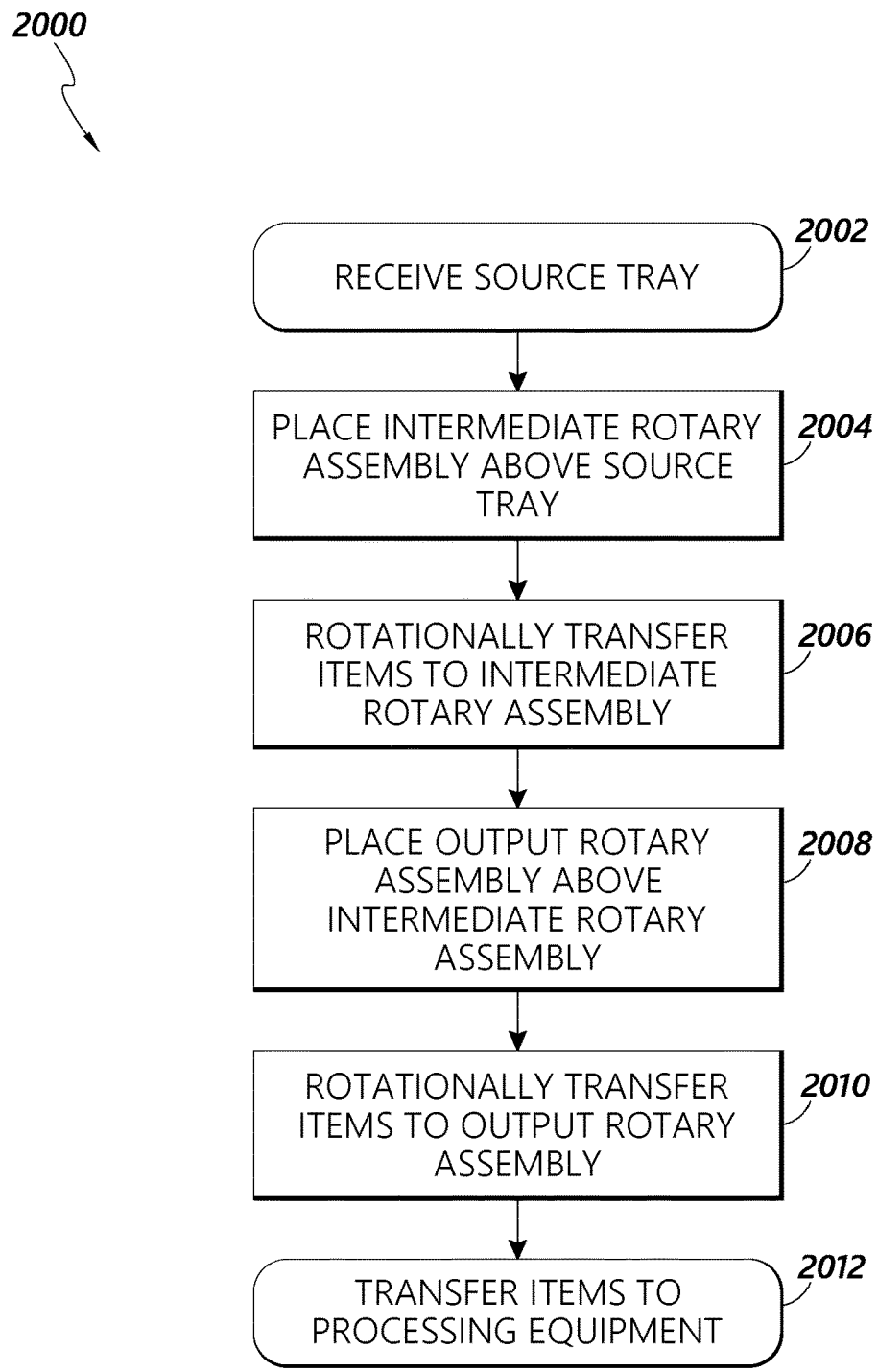
FIG. 20 is a flowchart illustrating an example method of transferring items from a tray to an item processing apparatus in a tray content transfer system.

FIG. 20 is a flowchart illustrating an example method 2000 of transferring items from a tray in a tray content transfer system. The method 2000 can be initiated at block 1940 of the method 1900 depicted in FIG. 19. Although the method 2000 will be described with reference to components of the tray content transfer system 200, the method 2000 can be performed by a computer integrated within any tray content transfer system such as the systems 105, 200, and 1800 depicted in FIGS. 1-18.

The method 2000 begins at block 2002, where a source tray is received within the tray content transfer system 200. The source tray may be tray 301 containing items 302 as shown in FIG. 3. Receiving the source tray 301 can include an operator placing the source tray 301 and/or may include detecting a source tray 301 entering the tray rotary assembly 220. Receiving the source tray 301 may also include moving the source tray 301 into position on the tray rotary assembly by the input conveyor 204. After the source tray 301 is received within the system 200, the method 2000 continues to block 2004.

At block 2004, an intermediate rotary assembly such as the intermediate rotary assembly 240 is placed above the source tray 301. In the example system 200, the intermediate rotary assembly 240 can be moved to a position above the tray rotary assembly 220, and can be rotationally oriented such that the platform 244 of the intermediate rotary assembly 240 is parallel to the platform 224 of the tray rotary assembly 220 and the fingers 2461, 246r at least partially surround the tray 301. The intermediate rotary assembly 240 and/or the fingers 2461, 246r can be moved by actuators such as actuators 1840-1895 (FIG. 18), based on instructions provided by the CPU 1820. After the intermediate rotary assembly 240 is placed above the source tray 301, the method 2000 continues to block 2006.

At block 2006, the items 302 are rotationally transferred to the intermediate rotary assembly 240. Rotationally transferring the items 302 from the tray 301 to the intermediate rotary assembly 240 can include rotating both the tray rotary assembly 220 and the intermediate rotary assembly 240 through the same angle of rotation, accompanied by linear translation of one or both of the tray rotary assembly 220 or the intermediate rotary assembly 240 as necessary to maintain the spacing between the tray rotary assembly 220 and the intermediate rotary assembly 240. For example, rotationally transferring the items 302 to the intermediate rotary assembly 240 may correspond to the portion of the tray content transfer process illustrated in FIGS. 5A-6B. The tray rotary assembly 220 and/or the intermediate rotary assembly 240 can be moved by actuators such as actuators 1840-1895 (FIG. 18), based on instructions provided by the CPU 1820. After the items 302 are rotationally transferred to the intermediate rotary assembly 240, the method 2000 continues to block 2008.

At block 2008, an output rotary assembly such as the output rotary assembly 260 is placed above the intermediate rotary assembly 240. In the example system 200, the output rotary assembly 260 can be moved to a position above the intermediate rotary assembly 240, and can be rotationally oriented such that the platform 264 of the output rotary assembly 260 is parallel to the platform 244 of the intermediate rotary assembly 240 and the fingers 2661, 266r at least partially surround the items 302. The intermediate rotary assembly 240 may also be moved toward the output rotary assembly 260 at block 2008 to facilitate the relative positioning of the intermediate rotary assembly 240 and the output rotary assembly 260. The spacing of the fingers 2661, 266r of the output rotary assembly 260 may be adjusted so as to correspond to the spacing of the fingers 2461, 246r (e.g., to be the same as or slightly larger than the spacing of the fingers 2461, 246r). For example, placing the output rotary assembly 260 above the intermediate rotary assembly 240 may correspond to the portion of the tray content transfer process illustrated in FIGS. 7A-9B. The intermediate rotary assembly 240, output rotary assembly 260, and/or the fingers 2661, 266r can be moved by actuators such as actuators 1840-1895 (FIG. 18), based on instructions provided by the CPU 1820. After the output rotary assembly 260 is placed above the intermediate rotary assembly 240, the method 2000 continues to block 2010.

At block 2010, the items 302 are rotationally transferred to the output rotary assembly 260. Rotationally transferring the items 302 from the intermediate rotary assembly 240 to the output rotary assembly 260 can include rotating both the intermediate rotary assembly 240 and the output rotary assembly 260 through the same angle of rotation, accompanied by linear translation of one or both of the intermediate rotary assembly 240 or the output rotary assembly 260 as necessary to maintain the spacing between the intermediate rotary assembly 240 and the output rotary assembly 260. For example, rotationally transferring the items 302 to the output rotary assembly 260 may correspond to the portion of the tray content transfer process illustrated in FIGS. 9A-11B. The intermediate rotary assembly 240 and/or the output rotary assembly 260 can be moved by actuators such as actuators 1840-1895 (FIG. 18), based on instructions provided by the CPU 1820. After the items 302 are rotationally transferred to the output rotary assembly 260, the method 2000 continues to block 2012.

The method 2000 terminates at block 2012, where items 302 are transferred to processing equipment. Transferring the items 302 to processing equipment can include, for example, lowering the left fingers 2661 of the output rotary assembly 260 and sliding the items 302 from the output rotary assembly 260 to a shelf 290 or other item receiving location with a paddle assembly 280 or other device. For example, transferring the items 302 to processing equipment may correspond to the portion of the tray content transfer process illustrated in FIGS. 12-16. The left fingers 2661 and/or the paddle assembly 280 can be moved by actuators such as actuators 1840-1895 (FIG. 18), based on instructions provided by the CPU 1820. After the items 302 have been transferred to processing equipment, the method 2000 terminates. The method 2000 may be repeated any number of times as additional source trays 303 of items 304 are received at the tray content transfer system 200. Subsequent iterations of the method 2000 may be initiated from block 2002 after a preceding iteration of the method 2000 has terminated and/or may be initiated from block 2002 while the preceding iteration of the method 2000 is still occurring. For example, the method 2000 may be initiated again when a new source tray is received but while block 2012 of the preceding iteration is still in progress.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged, or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A tray content transfer system comprising:
   a tray rotary assembly, the tray rotary assembly comprising a retainer configured to releasably secure a tray within the tray rotary assembly, wherein the tray rotary assembly is rotatable about a first axis;
   an intermediate rotary assembly movably coupled relative to the tray rotary assembly, the intermediate rotary assembly being rotatable about a second axis parallel to the first axis, being translatable along a horizontal axis perpendicular to the second axis, and being translatable along a vertical axis perpendicular to the second axis and the horizontal axis, the intermediate rotary assembly comprising:
      a first platform having a plurality of first slots therethrough parallel to the second axis; and
      a plurality of movable first fingers extending through the first slots and configured to support one or more items therebetween; and
   an output rotary assembly movably coupled relative to the tray rotary assembly and the intermediate rotary assembly, the output rotary assembly being rotatable about a third axis parallel to the first axis, being translatable along the horizontal axis and the vertical axis, the output rotary assembly comprising:
      a second platform having a plurality of second slots therethrough parallel to the third axis; and
      a plurality of movable second fingers extending through the second slots and configured to support the one or more items therebetween.

2. The tray content transfer system of claim 1, further comprising a controller configured to rotate the tray rotary assembly, the intermediate rotary assembly, and the output rotary assembly, to translate the intermediate rotary assembly and the output rotary assembly along the vertical axis and the horizontal axis, and to move the first fingers and the second fingers, in a predetermined sequence to transfer the one or more items from the tray to an output location, the predetermined sequence comprising:
receiving the tray containing the one or more items on the tray rotary assembly;
moving the intermediate rotary assembly to a position above the tray rotary assembly and a rotational orientation in which the first platform is parallel to a bottom surface of the tray;
simultaneously rotating the tray rotary assembly and the intermediate rotary assembly to rotationally transfer the one or more items from the tray rotary assembly to the intermediate rotary assembly;
moving the output rotary assembly to a position above the intermediate rotary assembly and a rotational orientation in which the second platform is parallel to the first platform; and
simultaneously rotating the intermediate rotary assembly and the output rotary assembly to rotationally transfer the one or more items from the intermediate rotary assembly to the output rotary assembly.

3. The tray content transfer system of claim 2, wherein at least a subset of the second fingers are retractable fingers configured to retract from an extended position in which the retractable fingers extend through the second slots beyond the second platform to a lowered position in which the retractable fingers do not extend beyond the second platform, the lowered position permitting items to slide along the second platform over the retractable fingers.

4. The tray content transfer system of claim 3, further comprising a paddle assembly including one or more paddles configured to slide items along the second platform when the second platform of the output rotary assembly is aligned with the output location.

5. The tray content transfer system of claim 4, wherein the predetermined sequence further comprises, after rotationally transferring the one or more items from the intermediate rotary assembly to the output rotary assembly:
moving the output rotary assembly to a position in which the second platform is aligned with the output location;
retracting the retractable fingers to the lowered position; and
causing the one or more paddles to slide the one or more items from the output rotary assembly to the output location.

6. The system of claim 4, wherein the one or more paddles are sized and spaced to fit between the plurality of movable second fingers of the output rotary assembly.

7. The tray content transfer system of claim 2, wherein the controller is further configured to:
determine a first finger spacing between the plurality of first fingers following the rotational transfer of the one or more items from the tray rotary assembly to the intermediate rotary assembly; and
move the plurality of second fingers to a second finger spacing corresponding to the first finger spacing prior to rotationally transferring the one or more items from the intermediate rotary assembly to the output rotary assembly.

8. The system of claim 7, wherein the one or more items comprise at least letters, envelopes, postcards, or flats.

9. The system of claim 8, wherein the first finger spacing is determined based on a compression force detected at one or more sensors disposed on one or more of the first fingers.

10. The tray content transfer system of claim 2, wherein the output location comprises a shelf associated with an item processing apparatus.

11. The tray content transfer system of claim 2, further comprising a sensor configured to detect the presence of the tray within the tray content transfer system, wherein the controller is configured to initiate the predetermined sequence based at least in part on detecting the presence of the tray.

12. The system of claim 11, wherein the sensor comprises at least a proximity sensor, a light gate, a photoelectric sensor, a pressure sensor, a force sensor, a profile sensor, an optical pattern recognition device, or a camera.

13. The tray content transfer system of claim 2, wherein the controller is further configured to translate the intermediate rotary assembly along the horizontal and vertical axes while rotationally transferring the one or more items from the tray rotary assembly to the intermediate rotary assembly, such that the first platform remains parallel to the bottom surface of the tray.

14. The tray content transfer system of claim 2, wherein the controller is further configured to translate at least the intermediate rotary assembly or the output rotary assembly along the horizontal and vertical axes while rotationally transferring the one or more items from the intermediate rotary assembly to the output rotary assembly, such that the second platform remains parallel to the first platform.

15. The system of claim 2, wherein receiving the tray containing the one or more items comprises positioning the tray rotary assembly at a first rotational orientation in which a tray-receiving surface of the tray rotary assembly is aligned with an input conveyor configured to supply trays containing items.

16. The system of claim 15, wherein the predetermined sequence further comprises rotating the tray rotary assembly to a second rotational orientation in which the tray-receiving surface of the tray rotary assembly is aligned with an output conveyor configured to receive empty trays.

17. The system of claim 16, wherein the output conveyor is disposed below the input conveyor.

18. The tray content transfer system of claim 1, wherein the retainer comprises a suction device configured to exert a suction force against a bottom surface of the tray.

19. The system of claim 1, wherein one or more of the plurality of movable second fingers are slidable and retractable fingers configured to slide longitudinally along the plurality of second slots and to retract and extend through the plurality of second slots.

20. The system of claim 19, wherein the slidable and retractable fingers are configured to retract and extend by tilting between a retracted position parallel to the second platform and an extended position perpendicular to the second platform.

* * * * *